(12) United States Patent  
Senda et al.

(10) Patent No.: US 7,389,476 B2
(45) Date of Patent: Jun. 17, 2008

(54) DISPLAY INCLUDING A PLURALITY OF DISPLAY PANELS

(75) Inventors: Michiru Senda, Gifu (JP); Masayuki Koga, Gifu (JP); Masahiro Okuyama, Inazawa (JP); Ryoichi Yokoyama, Ogaki (JP); Isao Akima, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 743 days.

(21) Appl. No.: 10/636,589

(22) Filed: Aug. 8, 2003

(65) Prior Publication Data

US 2004/0027315 A1 Feb. 12, 2004

(30) Foreign Application Priority Data

| Aug. 9, 2002 | (JP) | 2002-232790 |
| Aug. 9, 2002 | (JP) | 2002-232824 |
| Aug. 9, 2002 | (JP) | 2002-232856 |
| Aug. 9, 2002 | (JP) | 2002-232857 |

(51) Int. Cl.
*G06F 15/00* (2006.01)
*G06F 13/00* (2006.01)

(52) U.S. Cl. ........................ 715/768; 345/38
(58) Field of Classification Search ............... 715/761, 715/768, 778, 744, 700; 345/1.1, 38; 455/566, 455/567

See application file for complete search history.

(56) References Cited

U.S. PATENT DOCUMENTS

| 5,621,554 A | 4/1997 | Kuniyori |
| 5,764,324 A | 6/1998 | Lu et al. |
| 5,767,924 A | 6/1998 | Hiroki et al. |
| 5,896,575 A * | 4/1999 | Higginbotham et al. .... 455/566 |
| 6,005,645 A | 12/1999 | Hirakata et al. |
| 6,195,140 B1 * | 2/2001 | Kubo et al. .................... 349/44 |
| 6,792,293 B1 * | 9/2004 | Awan et al. ................ 455/566 |
| 2001/0020991 A1 | 9/2001 | Kubo et al. |
| 2001/0023194 A1 | 9/2001 | Pettersson et al. |
| 2002/0021274 A1 | 2/2002 | Koyama et al. |

FOREIGN PATENT DOCUMENTS

| CN | 1077983 | | 1/2002 |
| CN | 1339773 | A | 3/2002 |
| EP | 0 881 617 | | 12/1998 |
| EP | 1 146 502 | A2 | 10/2001 |
| EP | 1 204 089 | A1 | 5/2002 |
| JP | 07-199819 | | 8/1995 |
| JP | 08-194205 | | 7/1996 |
| JP | 10-198291 | | 7/1998 |
| JP | 2000-180845 | A | 6/2000 |
| JP | 2002-140051 | | 5/2002 |
| JP | P2002-162947 | A | 6/2002 |
| WO | WO 00/36578 | | 6/2000 |

* cited by examiner

*Primary Examiner*—Cao (Kevin) Nguyen
(74) *Attorney, Agent, or Firm*—McDermott Will & Emery LLP

(57) ABSTRACT

A display allowing further miniaturization when including a plurality of display panels is obtained. This display comprises a first display panel formed on a substrate and a second display panel formed on the same substrate on a region different from that formed with the first display panel. Thus, the display can be further miniaturized as compared with that having a first display panel and a second display panel formed on different substrates.

31 Claims, 20 Drawing Sheets

DISPLAY INCLUDING A PLURALITY OF DISPLAY PANELS

BACKGROUND OF THE INVENTION

1. Field of the Invention

The present invention relates to a display, and more particularly, it relates to a display including a plurality of display panels.

2. Description of the Related Art

A portable display employed as the display panel of a portable telephone or the like is known in general. A folding portable telephone or the like including two display panels, i.e., a main panel and a sub panel, is also known in general.

FIGS. 23 and 24 are perspective views showing the folding portable telephone 400 including two liquid crystal display panels, i.e., a main panel 401 and a sub panel 402. Referring to FIGS. 23 and 24, the conventional folding portable telephone 400 is constituted of a display part 400a and an operation part 400b. The display part 400a includes the main panel 401 provided on the surface closer to the operation part 400b and the sub panel 402 provided on the surface opposite to the operation part 400b. When the portable telephone 400 is not used, the display part 400a is folded toward the operation part 400b as shown in FIG. 23. In this folded state, the sub panel 402 displays time information or the like. When the portable telephone 400 is used, the display part 400a is opened along arrow in FIG. 23 and brought into the state shown in FIG. 24. In this state, the main panel 401 displays a telephone number, a dynamic image or the like.

The housing of the aforementioned portable telephone 400 is inconveniently increased in size due to the main panel 401 and the sub panel 402 mounted thereon independently of each other. Therefore, the portable telephone 400 is hard to miniaturize.

In relation to a portable apparatus such as the portable telephone 400 including a main panel and a sub panel, therefore, there is proposed a technique of arranging the main panel and the sub panel above and under a backlight thereby sharing the backlight by the main panel and the sub panel. Thus, the housing of the portable apparatus can be miniaturized due to the shared backlight.

A liquid crystal display used for the portable apparatus must be further miniaturized in response to particularly strong requirement for miniaturization. In the aforementioned technique of sharing the backlight, however, the main panel and the sub panel themselves are mounted independently of each other, and hence miniaturization of the liquid crystal display is limited. Consequently, it is difficult to further miniaturize the liquid crystal display according to the aforementioned technique of sharing the backlight.

In the aforementioned technique of sharing the backlight, further, the main panel and the sub panel themselves are mounted independently of each other, and hence it is difficult to further reduce the number of components and further simplify assembling steps. Consequently, it is also difficult to further reduce the component cost as well as the device cost.

SUMMARY OF THE INVENTION

The present invention provides a display allowing further miniaturization when including a plurality of display panels.

A display according to a first aspect of the present invention comprises a first display panel formed on a substrate and a second display panel formed on the same substrate in a region different from the region formed with the first display panel.

As hereinabove described, the display according to the first aspect is provided with the first display panel and the second display panel on different regions of the same substrate, whereby the display can be further miniaturized as compared with that having a first display panel and a second display panel formed on different substrates. Further, the first display panel and the second display panel are so provided on the same substrate that the display requires only a single substrate and a peripheral circuit can be shared, whereby the number of components can be further reduced. In addition, the first display panel and the second display panel are so provided on the same substrate that assembling steps can be further simplified as compared with a case of forming the first display panel and the second display panel on different substrates. The component cost as well as the device cost can be further reduced due to such reduction of the number of components and simplification of the assembling steps.

A display according to a second aspect of the present invention comprises a first display panel formed on a substrate, a second display panel formed on the same substrate in a region different from the region formed with the first display panel and a shift register shared by the first display panel and the second display panel.

According to the second aspect, as hereinabove described, the first display panel and the second display panel are formed on different regions of the same substrate to share the shift register, whereby the display can be further miniaturized as compared with that having a first display panel and a second display panel formed on different substrates. Further, the first display panel and the second display panel share the substrate and the shift register, whereby the number of components can be further reduced and assembling steps can be further simplified. Thus, the component cost as well as the device cost can be further reduced.

A display according to a third aspect of the present invention comprises a first display panel formed on a substrate, a second display panel formed on the same substrate in a region different from the region formed with the first display panel, and a drain line and a gate line arranged to intersect with each other, while either the drain line or the gate line continuously extends from the first display panel to the second display panel.

According to the third aspect, as hereinabove described, either the drain line or the gate line is formed to continuously extend from the first display panel to the second display panel, whereby the number of either gate lines or drain lines can be so reduced that power consumption can be reduced and a narrow frame can be obtained.

A display according to a fourth aspect of the present invention comprises a first display panel formed on a substrate, a second display panel formed on the same substrate in a region different from the region formed with the first display panel, a drain line and a gate line arranged on the substrate to intersect with each other and a static memory built in the second display panel for holding a signal from the drain line in response to a signal input from the gate line.

According to the fourth aspect, as hereinabove described, the first display panel and the second display panel are formed on different regions of the same substrate, whereby the display can be further miniaturized as compared with that having a first display panel and a second display panel formed on different substrates. Further, the first display panel and the second display panel share the substrate, whereby the number of components can be further reduced and assembling steps can be further simplified. Thus, the component cost as well as the device cost can be further reduced. Further, the static memory for holding a signal is so built in the second display panel as to hold the signal, whereby information on the second display panel may hardly be rewritten. Thus, a signal line driving circuit for scanning the gate line and the drain line can be shut down up to subsequent change of display contents on the second display panel when only the second display panel is used, whereby power consumption can be reduced.

A display according to a fifth aspect of the present invention comprises a first display panel formed on a substrate so that a signal is scanned at a first scanning frequency and a second display panel formed on the same substrate in a region different from the region formed with the first display panel so that a signal is scanned at a second scanning frequency different from the first scanning frequency.

According to the fifth aspect, as hereinabove described, the first display panel and the second display panel are formed on different regions of the same substrate, whereby the display can be further miniaturized as compared with that having a first display panel and a second display panel formed on different substrates. Further, the first display panel and the second display panel share the substrate, whereby the number of components can be further reduced and assembling steps can be further simplified. Thus, the component cost as well as the device cost can be further reduced. In addition, the first and second scanning frequencies for the first display panel and the second display panel are rendered different from each other, whereby the first scanning frequency for the first display panel can be rendered larger than the second scanning frequency for the second display panel when the first display panel requires a large number of rewriting times for displaying dynamic images or the like while the second display panel requires no large number of rewriting times for displaying still images or the like, for example.

The foregoing and other features, aspects and advantages of the present invention will become more apparent from the following detailed description of the present invention when taken in conjunction with the accompanying drawings.

DESCRIPTION OF THE PREFERRED EMBODIMENTS

Figure 1:
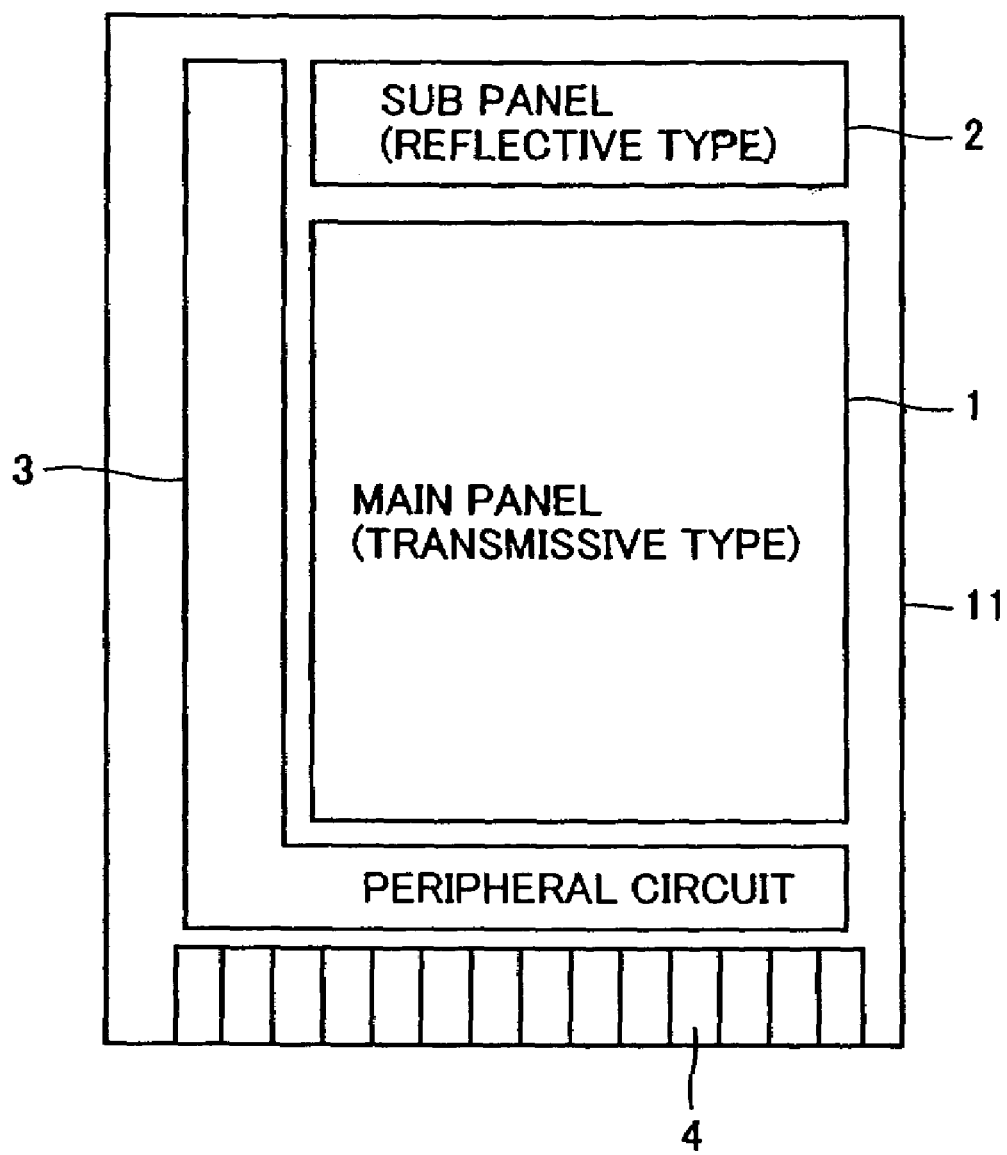
FIG. 1 is a plan view showing a liquid crystal display including a main panel and a sub panel according to a first embodiment of the present invention.

Embodiments of the present invention are now described with reference to the drawings.

First Embodiment

A liquid crystal display according to a first embodiment of the present invention is described with reference to FIGS. 1 and 2. According to the first embodiment, a main panel 1 and a sub panel 2 are formed on different regions of a first glass substrate 11. A peripheral circuit 3 is arranged around main panel 1 and the sub panel 2. An external connection terminal 4 is provided on an end of the first glass substrate 11.

Figure 2:
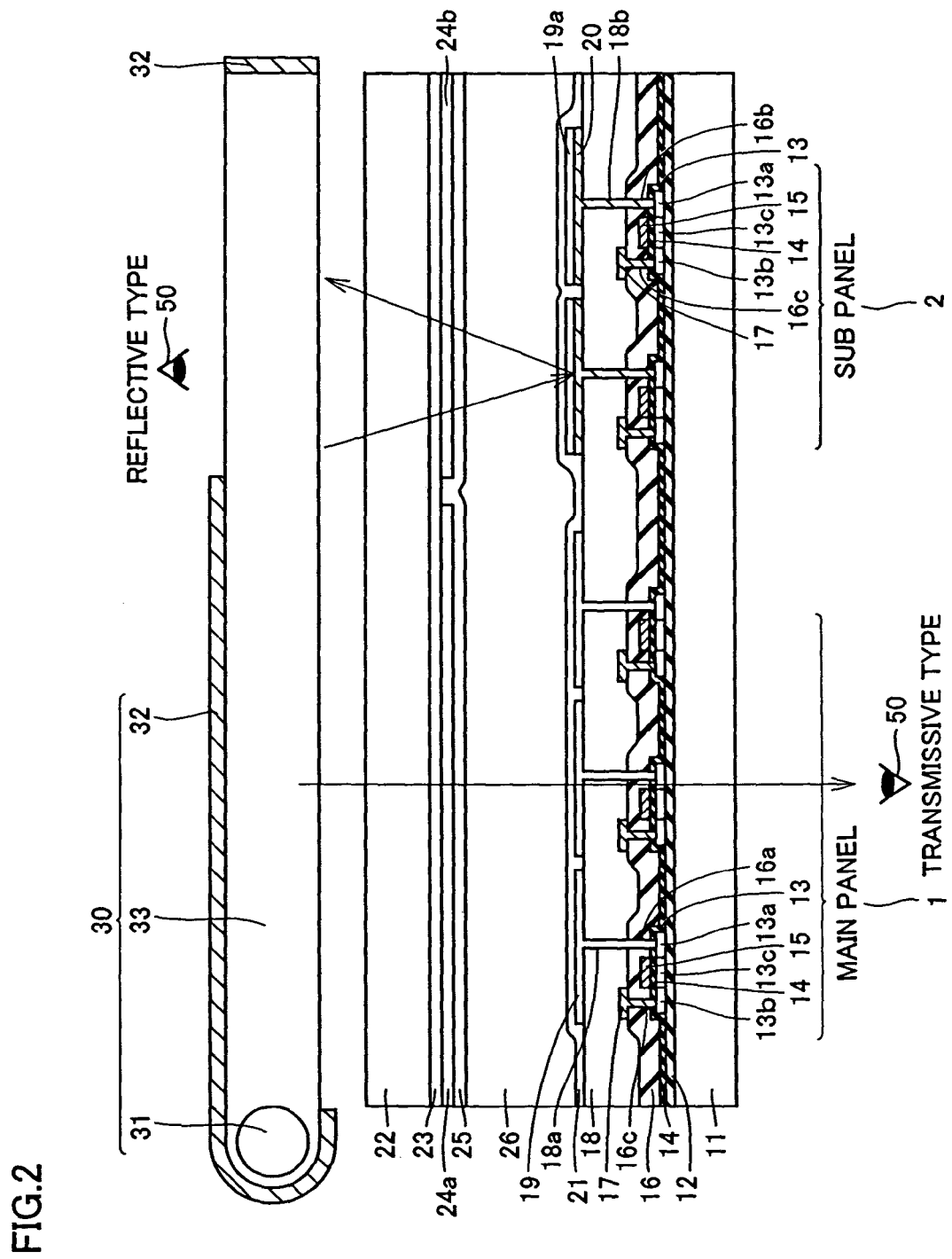
FIG. 2 is a sectional view showing the liquid crystal display according to the first embodiment shown in FIG. 1.

In the liquid crystal display according to the first embodiment, the main panel 1 is a transmissive panel whose display is observed by an observer 50 from the side of the first glass substrate 11 and the sub panel 2 is a reflective panel whose display is observed by the observer 50 from the side of a second glass substrate 22, as shown in FIG. 2. The first glass substrate 11 is an example of the "substrate" or the "first substrate" in the present invention, and the second glass substrate 22 is an example of the "second substrate" in the present invention. The main panel 1 is an example of the "first display panel" or the "main display panel" in the present invention, and the sub panel 2 is an example of the "second display panel" or the "auxiliary display panel" in the present invention. Each of the main panel 1 and the sub panel 2 is an active matrix panel having a plurality of pixels and including a TFT (thin-layer transistor) every pixel.

The sectional structure of the liquid crystal display according to the first embodiment shown in FIG. 1 is described with reference to FIG. 2. In the liquid crystal display according to the first embodiment, an insulating layer 12 consisting of a laminated layer of $SiO_2$ and $SiN_x$ is formed on the first glass substrate 11. P-Si layers 13 islanded at prescribed intervals are formed on regions of the insulating layer 12 formed with the main panel 1 and the sub panel 2 respectively.

A source region 13a and a drain region 13b are formed on each p-Si layer 13 to hold a channel region 13c therebetween. A gate electrode 15 is formed on the channel region 13c through a gate insulating layer 14. The source region 13a, the drain region 13b, the channel region 13c, the gate insulating layer 14 and the gate electrode 15 constitute a polycrystalline silicon thin-layer transistor (hereinafter referred to as a p-Si TFT) serving as a pixel driving transistor. The p-Si TFT advantageously has larger mobility and larger drivability as compared with a TFT employing an amorphous silicon layer for an active layer. Therefore, a high-performance liquid crystal display can be implemented with p-Si TFTs.

An interlayer insulating layer 16 is formed to cover the p-Si TFTs and the gate insulating layers 14. Drain electrodes 17 are formed to be electrically connected to the drain regions 13b through contact holes 16c of the interlayer insulating layer 16 while extending along the upper surface of the interlayer insulating layer 16. A planarizing layer 18 is formed to cover the interlayer insulating layer 16 and the drain electrodes 17. On the region formed with the main panel 1, transparent electrodes 19 are formed to be electrically connected to the source regions 13a through contact holes 16a and 18a provided in the interlayer insulating layer 16 and the planarizing layer 18 respectively while extending along the upper surface of the planarizing layer 18. These transparent electrodes 19 consist of transparent conductive layers such as ITO (indium tin oxide) layers, and constitute pixel electrodes of the main panel 1.

On the region formed with the sub panel 2, reflective electrodes 20 are formed to be electrically connected to the source regions 13a through contact holes 16b and 18b provided in the interlayer insulating layer 16 and the planarizing layer 18 while extending along the upper surface of the planarizing layer 18. These reflective electrodes 20 are made of a material such as Al having high reflectance. Transparent electrodes 19a consisting of transparent conductive layers such as ITO layers are formed on the upper surfaces of the reflective electrodes 20. The reflective electrodes 20 and the transparent electrodes 19a constitute pixel electrodes of the sub panel 2. An alignment layer 21 consisting of polyimide or the like is formed on the transparent electrodes 19 of the main panel 1, the reflective electrodes 20 and the transparent electrodes 19a of the sub panel 2 and the planarizing layer 18.

A color filter 23 presenting three colors of red (R), green (G) and blue (B) is formed on the second glass substrate 22. A common electrode 24a, consisting of a transparent conductive layer such as an ITO layer and having a thickness of about 80 nm to about 100 nm, for the main panel 1 is formed on a region of the color filter 23 formed with the main panel 1. A common electrode 24b, consisting of a transparent conductive layer such as an ITO layer and having a thickness of about 80 nm to about 100 nm, for the sub panel 2 is formed on a region of the color filter 23 formed with the sub panel 2. The common electrodes 24a and 24b for the main panel 1 and the sub panel 2 are formed to be electrically isolated from each other at a prescribed interval. The common electrodes 24a and 24b are examples of the "first common electrode" and the "second common electrode" in the present invention respectively.

An alignment layer 25 consisting of polyimide or the like is formed on the common electrodes 24a and 24b. The clearance between the alignment layers 21 and 25 formed on the first and second glass substrates 21 and 22 respectively is filled up with liquid crystals 26.

A backlight unit 30 is arranged on the rear surface of the second glass substrate 22. This backlight unit 30 includes a cold cathode fluorescent tube 31, a reflector 32 consisting of a metal and a light guide plate 33 consisting of acrylic. A region of the reflector 32 corresponding to the sub panel 2 is in an open state. Thus, light emitted from the backlight unit 30 is incident not only on the main panel 1 but also on the sub panel 2. In other words, the main panel 1 and the sub panel 2 share the backlight unit 30. Thus, the high-priced cold cathode fluorescent tube 31 is so sharable that the cost for a light source can be reduced. When exclusively used in the daytime, the reflective sub panel 2 reflects external light for making display.

In the main panel 1, the light emitted from the backlight unit 30 is incident from the side of the second glass substrate 22, passes through the liquid crystals 26 and the first glass substrate 11. Thus, the observer 50 observes the display on the main panel 1 from the side of the first glass substrate 11. In the sub panel 2, on the other hand, the light emitted from the backlight unit 30 or the external light is incident from the side of the second glass substrate 22, passes through the liquid crystals 26 and is reflected by the reflective electrodes 20 toward the second glass substrate 22. Thus, the observer 50 observes the display on the sub panel 2 from the side of the second glass substrate 22.

According to the first embodiment, as hereinabove described, the main panel 1 and the sub panel 2 are so provided on the same first glass substrate 11 that the liquid crystal display can be further miniaturized as compared with that having a main panel and a sub panel formed on different substrates. The peripheral circuit 3 is so sharable with the main panel 1 and the sub panel 2 that the number of components can be reduced. In addition, assembling steps can be further simplified as compared with a case of forming the main panel 1 and the sub panel 2 on different substrates. The component cost as well as the device cost can be further reduced due to such reduction of the number of components and simplification of the assembling steps.

According to the first embodiment, further, display of the transmissive main panel 1 and that of the reflective sub panel 2 can be made on one and the other surfaces of a single liquid crystal display panel respectively. In this case, the main panel 1 displaying dynamic images or the like must be improved in picture quality. According to the first embodiment, the transmissive main panel 1 employing the backlight unit 30 as the light source can be improved in picture quality. On the other hand, the sub panel 2 displaying time or the like may not be much improved in picture quality but must be reduced in power consumption. According to the first embodiment, the reflective sub panel 2 requiring no light source in the daytime can be reduced in power consumption. When this liquid crystal display is applied to a portable apparatus such as a portable telephone, the life of a battery can be prolonged.

According to the first embodiment, in addition, the common electrodes 24a and 24b for the main panel 1 and the sub panel 2 are so electrically isolated from each other that a voltage can be applied to only an exclusively used one of the main panel 1 and the sub panel 2. Thus, the power can be saved.

According to the first embodiment, further, the transparent electrodes 19a are formed on the reflective electrodes 20 in the region formed with the sub panel 2 so that the upper surfaces of the transparent electrodes 19a as the pixel electrode contacts with the liquid crystals 26. Thus, characteristics with respect to the liquid crystals 26 can be improved as compared with a case that the upper surfaces of the reflective electrodes 20 as the pixel electrode contacts with the liquid crystals 26. Consequently, the liquid crystals 26 can be inhibited from deterioration resulting from formation of the reflective electrodes 20.

The aforementioned liquid crystal display according to the first embodiment is particularly preferably employed as a liquid crystal display for a portable telephone.

Figure 3:
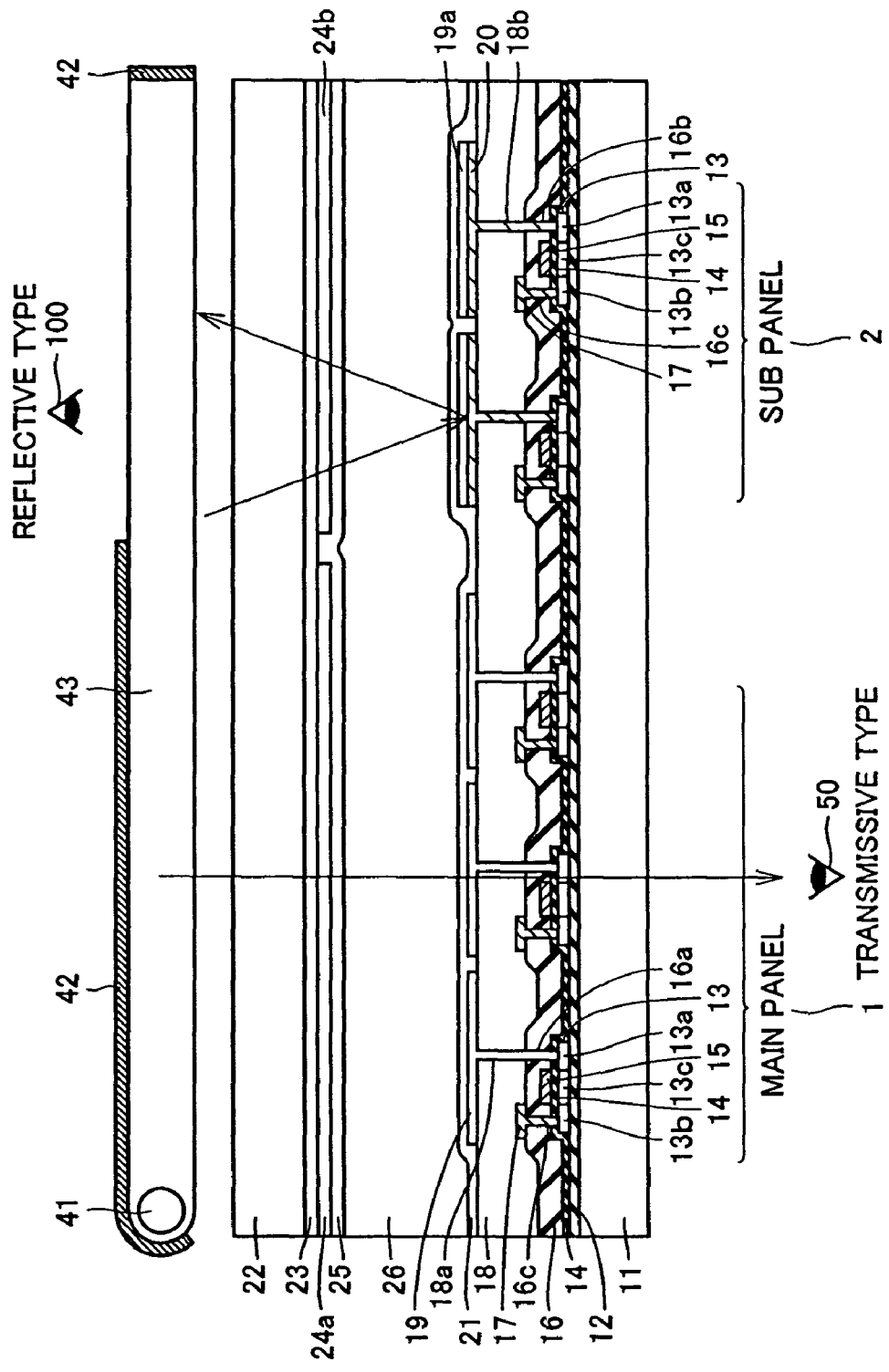
FIG. 3 is a sectional view showing a liquid crystal display including a main panel and a sub panel according to a modification of the first embodiment of the present invention.

FIG. 3 shows a liquid crystal display according to a modification of the first embodiment. The liquid crystal display according to this modification employs an LED light source, dissimilarly to that according to the first embodiment shown in FIG. 1. The remaining structure of the liquid crystal display according to this modification is similar to that of the aforementioned liquid crystal display according to the first embodiment. According to the modification of the first embodiment, an LED 41 is set on an end of a region, formed with a main panel 1, of the rear surface of a second glass substrate 22. A light guide plate 43 is arranged on a region of the rear surface of the second glass substrate 22 formed with the main panel 1 and a sub panel 2. Further, a reflector 42 is set on a region of the rear surface of the second glass substrate 22 formed with the main panel 1 and an end of the region formed with the sub panel 2 respectively. According to the modification of the first embodiment, luminance and power consumption can be adjusted by controlling a current passing through the LED 41.

Second Embodiment

According to a second embodiment of the present invention, a main panel is observed from a side of one substrate formed with TFTs while a reflection sub panel is observed from a side of other substrate in a liquid crystal display, dissimilarly to the aforementioned first embodiments. Portions of the second embodiment different from the aforementioned first embodiment are now described in detail with reference to FIG. 4.

In the liquid crystal display according to the second embodiment, the main panel 51 and the sub panel 52 are formed on the same first glass substrate 61 as the first embodiment. The main panel 51 is a transmissive panel whose display is observed by an observer 50 from the side of the second glass substrate 72, and the sub panel 52 is a reflective panel whose display is observed by the observer 50 from the side of the first glass substrate 61. The first glass substrate 61 is an example of the "substrate" or the "first substrate" in the present invention, and the second glass substrate 72 is an example of the "second substrate" in the present invention. The main panel 51 is an example of the "first display panel" or the "main display panel" in the present invention, and the sub panel 52 is an example of the "second display panel" or the "auxiliary display panel" in the present invention.

The first glass substrate 61, an insulating layer 62, p-Si layers 63 including source regions 63a, drain regions 63b and channel regions 63c, gate insulating layers 64, gate electrodes 65, an interlayer insulating layer 66 having contact holes 66a and 66b, drain electrodes 67 and a planarizing layer 68 having contact holes 68a are similar in structure to the aforementioned first embodiment respectively. Transparent electrodes 69 are formed to be electrically connected to the source regions 63a through the contact holes 68a and 66a provided in the planarizing layer 68 and the interlayer insulating layer 66 respectively while extending along the upper surface of the planarizing layer 68. These transparent electrodes 69 are provided on both regions formed with the main panel 51 and the sub panel 52 respectively. Further, the transparent electrodes 69 consist of transparent conductive layers such as ITO layers or the like, and constitute pixel electrodes of the main panel 51 and the sub panel 52. An alignment layer 70 consisting of polyimide or the like is formed on the transparent electrodes 69 and the planarizing layer 68.

The second glass substrate 72, a color filter 73, common electrodes 74a and 74b, an alignment layer 75 and liquid crystals 76 are also similar in structure to the aforementioned first embodiment respectively. The common electrodes 74a and 74b are examples of the "first common electrode" and the "second common electrode" in the present invention respectively.

According to the second embodiment, a reflective layer 71 consisting of a material such as Al having high reflectance and having a thickness of about 80 nm to about 100 nm is formed on the rear surface of the second glass substrate 72. This reflective layer 71 reflects light incident upon the sub panel 52.

A backlight unit 80 including a cold cathode fluorescent tube 80a, a reflector 80b and a light guide plate 80c are arranged on the rear surface of the first glass substrate 61. Thus, light emitted from the backlight unit 80 is incident upon the main panel 51 from the side of the first glass substrate 61, passes through the liquid crystals 76 and the second glass substrate 72. Therefore, the observer 50 observes the display on the main panel 51 from the side of the second glass substrate 72. In the sub panel 52, on the other hand, the light emitted from the backlight unit 80 or external light is incident from the side of the first glass substrate 61, passes through the liquid crystals 76 and is reflected by the reflective layer 71 toward the first glass substrate 61. Thus, the observer 50 observes the display on the sub panel 52 from the side of the first glass substrate 61.

According to the second embodiment, as hereinabove described, the reflective layer 71 provided on the rear surface of the second glass substrate 72 on the region formed with the sub panel 52 can reflect the light incident through the first glass substrate 61 to pass through the liquid crystals 76, whereby the reflective sub panel 52 can be so easily formed that the display thereof is observable from the side of the first glass substrate 61. The reflective sub panel 52 is so combined with the transmissive main panel 51 whose display is observable from the side of the second glass substrate 72 that a double-sided liquid crystal display can be easily obtained.

According to the second embodiment, further, the transparent electrodes 69 form the pixel electrodes of the main panel 51 and the sub panel 52 so that the pixel electrodes of the main panel 51 and the sub panel 52 can be formed through the same process, whereby the manufacturing process can be simplified.

Effects of the second embodiment attained through the similar structure or method as that in the first embodiment are similar to those of the aforementioned first embodiment.

Third Embodiment

According to a third embodiment of the present invention, a main panel is formed by a transflective panel and a sub panel is formed by a reflective panel in a liquid crystal display, dissimilarly to the aforementioned first and second embodiments. Portions of the third embodiment different from the aforementioned embodiments are now described in detail with reference to FIG. 5.

In the liquid crystal display according to the third embodiment, the main panel 81 and the sub panel 82 are formed on the same first glass substrate 91. The main panel 81 is a transflective panel whose display is observed by an observer 50 from the side of a second glass substrate 102, and the sub panel 82 is a reflective panel whose display is observed by the observer 50 from the side of the first glass substrate 91. The first glass substrate 91 is an example of the "substrate" or the "first substrate" in the present invention, and the second glass substrate 102 is an example of the "second substrate" in the present invention. The main panel 81 is an example of the "first display panel" or the "main display panel" in the present invention, and the sub panel 82 is an example of the "second display panel" or the "auxiliary display panel" in the present invention.

The first glass substrate 91, an insulating layer 92, p-Si layers 93 including source regions 93a, drain regions 93b and channel regions 93c, gate insulating layers 94, gate electrodes 95, an interlayer insulating layer 96 having contact holes 96a to 96c and drain electrodes 97 are similar in structure to the aforementioned first embodiment respectively.

A planarizing layer 98 having contact holes 98a and 98b and concave portions 98c is formed to cover the drain electrodes 97 and the interlayer insulating layer 96. Further, reflective electrodes 99 are formed on the region formed with the main panel 81 to be electrically connected to the source regions 93a through the contact holes 98a and 96a provided in the planarizing layer 98 and the interlayer insulating layer 96 respectively while extending along the upper surface of the planarizing layer 98. These reflective electrodes 99 are made of Al or the like, and constitute reflective regions of the transflective main panel 81. Transparent electrodes 100a consisting of transparent conductive layers such as ITO layers are formed on the upper surfaces of the reflective electrodes 99 and the concave portions 98c of the planarizing layer 98. The regions formed with the transparent electrodes 100a on the concave portions 98c constitute transmissive regions of the transflective main panel 81. The reflective electrodes 99 and the transparent electrodes 100a constitute pixel electrodes of the main panel 81.

Transparent electrodes 100 consisting of transparent conductive layers such as ITO layers are formed on the region formed with the sub panel 82 similarly to the first embodiment, to constitute pixel electrodes of the sub panel 82.

A reflective layer 107 consisting of a material such as Al having high reflectance and having a thickness of about 80 nm to about 100 nm is formed on the region of the second glass substrate 102 formed with the sub panel 82. This reflective layer 107 is so provided as to reflect light incident upon the sub panel 82. A color filter 103 is formed on the reflective layer 107 provided on the region formed with the sub panel 82 and on the region of the glass substrate 102 formed with the main panel 81.

This color filter 103 includes black matrices (black regions) 103 which are black portions formed between pixels, pale red regions 103b, a deep red region 103c, pale green regions 103d, a deep green region 103e, a pale blue region 103f and a deep blue region 103g. One of the pale red regions 103b, one of the pale green regions 103d and the pale blue region 103f are formed on regions corresponding to the reflective regions of the main panel 81. The deep red region 103c, the deep green region 103e and the deep blue region 103g are formed on regions corresponding to the concave portions 98c of the planarizing layer 98 constituting the transmissive regions of the main panel 81. The other pale red region 103b, the other pale green region 103d and another pale blue region 103f (not shown) are formed on regions corresponding to the transparent electrodes 100 of the reflective sub panel 82.

In the region formed with the transflective main panel 81 according to the third embodiment, the colors of the regions corresponding to the reflective regions than those of the regions corresponding to the transmissive regions in the color filter 103 for the following reason: Light passes through the color filter 103 twice in the reflective regions while only once in the transmissive regions, and hence display on the reflective regions exhibits deeper colors than display on the transmissive regions. In order to set the display on the reflective regions and that on the transmissive regions to similar levels of color depth, therefore, the regions corresponding to the reflective regions are paled and those corresponding to the transmissive regions are deepened in the color filter 103.

Common electrodes 104a and 104b according to the third embodiment are similar in structure to commonthe first embodiment respectively. The common electrodes 104a and 104b are examples of the "first common electrode" and the "second common electrode" in the present invention respectively.

An alignment layer 105 consisting of polyimide or the like is formed on the common electrodes 104a and 104b. A clearance between the alignment layers 102 and 101 provided on the second and first glass substrates 102 and 91 respectively is filled up with liquid crystals 106. According to the third embodiment, the concave portions 98c are so formed in the planarizing layer 98 that the thickness $x_1$ of portions of the liquid crystals 106 located on the reflective regions of the transflective main panel 81 is half the thickness $x_2$ of portions of the liquid crystals 106 located on the transmissive regions. The light passes through the liquid crystals 106 twice in the reflective regions while only one in the transmissive regions. Hence the thickness $x_1$ of the portion of the liquid crystals 106 located on the reflective regions is rendered half the thickness $x_2$ of the portions of the liquid crystals 106 located on the transmissive reagions, in order to equalize optical path lengths of the light in the reflective regions and the transmissive regions to each other.

According to the third embodiment, a backlight unit 110 including a cold cathode fluorescent tube 111, a reflector 112 and a light guide plate 113 is arranged on the rear surface of the first glass substrate 91. This backlight unit 110 is similar in structure to the second embodiment shown in FIG. 4.

In the main panel 81, light emitted from the backlight unit 110 is incident from the side of the first glass substrate 91, passes through the liquid crystals 106 and the second glass substrate 102. Further, external light is incident from the side of the second glass substrate 102, passes through the liquid crystals 106 and is reflected by the reflective electrodes 99 toward the second glass substrate 102. Thus, the observer 50 observes the display on the main panel 81 from the side of the second glass substrate 102. In the sub panel 82, on the other hand, the light emitted from the backlight unit 110 or the external light is incident from the side of the first glass substrate 91, passes through the liquid crystals 106 and is reflected by the reflective layer 107 toward the first glass substrate 91. Thus, the observer 50 observes the display on the sub panel 82 from the side of the first glass substrate 91.

According to the third embodiment, as hereinabove described, the reflective layer 107 provided on the surface of the second glass substrate 102 on the region formed with the sub panel 82 can reflect the light incident through the first glass substrate 91 to pass through the liquid crystals 106, whereby the reflective sub panel 82 can be so easily formed that the display thereof is observable from the side of the first glass substrate 91. The reflective sub panel 82 is so combined with the transflective main panel 81 whose display is observable from the side of the second glass substrate 102 that a double-sided liquid crystal display can be easily obtained.

According to the third embodiment, further, the reflective layer 107 of the sub panel 82 is so formed between the second glass substrate 102 and the color filter 103 that the light incident from the side of the first glass substrate 91 is reflected by the reflective layer 107 without passing through the second glass substrate 102, whereby the second glass substrate 102 causes no light absorption loss. Thus, the sub panel 82 can be inhibited from reduction of brightness. Further, the surface of the reflective layer 107 can be effectively inhibited from deterioration due to the color filter 103 on the same.

According to the third embodiment, in addition, the main panel 81 is so formed by a transflective panel that the cold cathode ray tube 111 of the backlight unit 110 can be reduced in size as compared with that for a transmissive main panel. Thus, power consumption can be further reduced.

According to the third embodiment, further, the transparent electrodes 100a are so formed on the reflective electrodes 99 in the region formed with the main panel 81 so that the upper surfaces of the transparent electrodes 100a as the pixel electrode contacts with the liquid crystals 106. Thus, characteristics with respect to the liquid crystals 106 can be improved as compared with a case that the upper surfaces of the reflective electrodes 20 as the pixel electrode contacts with the liquid crystals 106. Consequently, the liquid crystals 106 can be inhibited from deterioration of characteristics resulting from formation of the reflective electrodes 99.

In the third embodiment, a part of the planarizing layer 98 may be etched to expose an interlayer insulating layer 96 and the etched part of the planarizing layer 98 may be used as concave portions 98c.

Effects of the third embodiment attained by the similar structure or method as that in the first or second embodiment are similar to those in the first or second embodiment.

Fourth Embodiment

According to a fourth embodiment of the present invention, a one-side liquid crystal display whose main panel and sub panel are observed from the same side of a substrate is formed, dissimilarly to the aforementioned embodiments. Portions different from those of the liquid crystal displays according to the aforementioned first to third embodiments are now described in detail with reference to FIG. 6.

In the liquid crystal display according to the fourth embodiment, the main panel 161 and the sub panel 162 are formed on the same first glass substrate 121. The main panel 161 is a transflective panel whose display is observed by an observer 50 from the side of the second glass substrate 132, and the sub panel 162 is a reflective panel whose display is also observed by the observer 50 from the side of the second glass substrate 132. In other words, the liquid crystal display according to the fourth embodiment is a single-sided liquid crystal display so formed that the observer 50 observes both of the display on the main panel 161 and that on the sub panel 162 from same side of the second glass substrate 132. The first glass substrate 121 is an example of the "substrate" or the "first substrate" in the present invention, and the second glass substrate 132 is an example of the "second substrate" in the present invention. The main panel 161 is an example of the "first display panel" or the "main display panel" in the present invention, and the sub panel 162 is an example of the "second display panel" or the "auxiliary display panel" in the present invention.

The first glass substrate 121, an insulating layer 122, p-Si layers 123 including source regions 123a, drain regions 123b and channel regions 123b, a gate insulating layer 124, gate electrodes 125, an interlayer insulating layer 126 having contact holes 126a to 126c and drain electrodes 127 according to the fourth embodiment are similar in structure to the elements from the first glass substrate 11 to the drain electrodes 17 according to the aforementioned first embodiment. A planarizing layer 128 having contact holes 128a and 128b and concave portions 128c is formed to cover the drain electrodes 127 and the interlayer insulating layer 126. The liquid crystal display according to the fourth embodiment is further provided with reflective electrodes 129a and transparent electrodes 130a similar in structure to the third embodiment respectively.

According to the fourth embodiment, reflective electrodes 129b and transparent electrodes 130b similar in structure to the first embodiment respectively are formed on the region formed with the sub panel 162. The reflective electrodes 129b and the transparent electrodes 130b constitute pixel electrodes of the sub panel 162.

Figure 5:
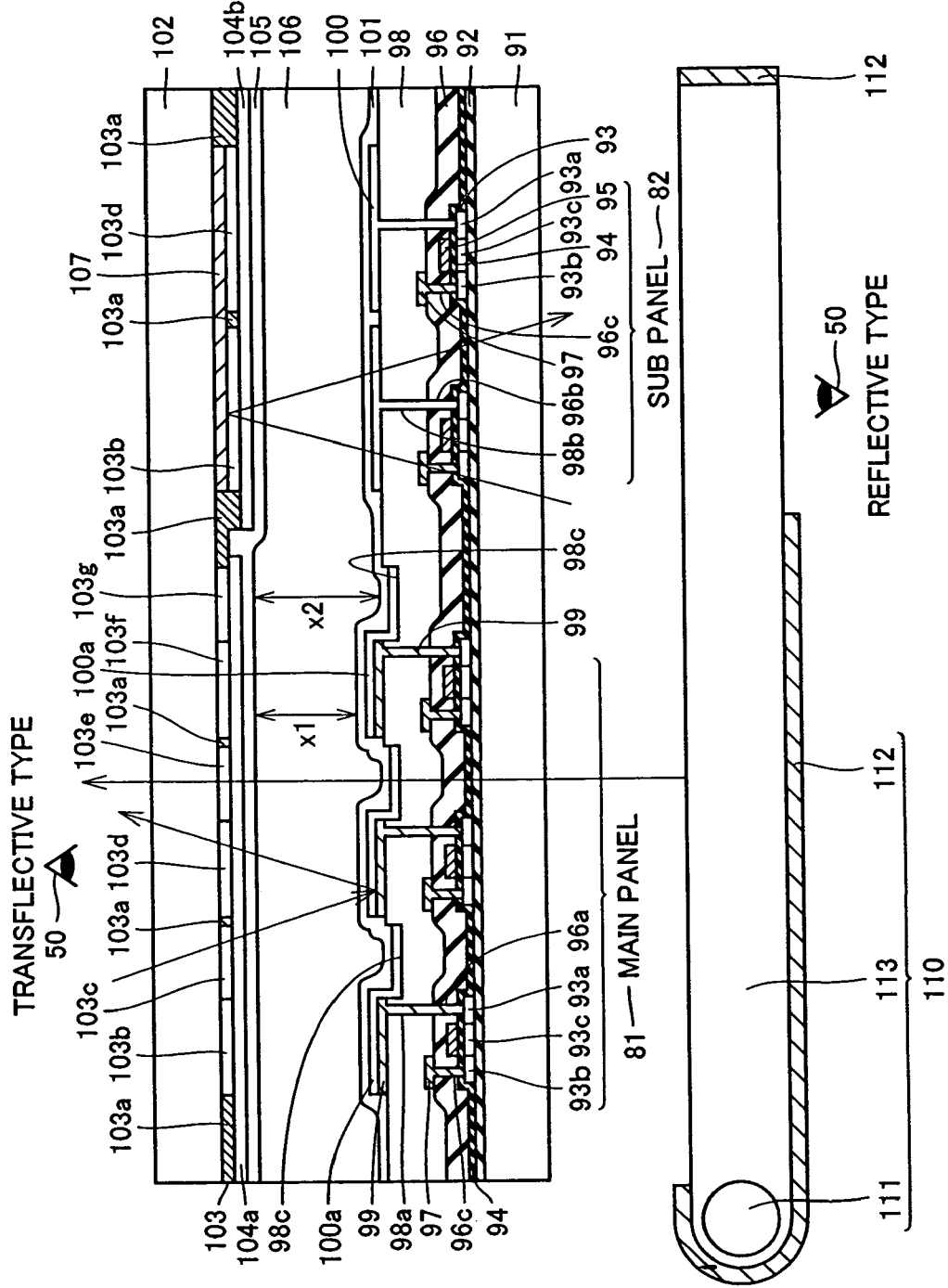
FIG. 5 is a sectional view showing a liquid crystal display including a main panel and a sub panel according to a third embodiment of the present invention.

Thus, the fourth embodiment, which is identical to the third embodiment in the point that the main panel 161 is a transflective panel and the sub panel 162 is a reflective panel, is different from the third embodiment in the point that the sub panel 162 has the pixel electrodes consisting of the reflective electrodes 129b and the transparent electrodes 130b similarly to the first embodiment with no reflective layer 107 (see FIG. 5).

The reflective electrodes 129a and 129b of the main panel 161 and the sub panel 162 are formed by the same layer, while the transparent electrodes 130a and 130b of the main panel 161 and the sub panel 162 are formed by the same layer. Further, the liquid crystal display according to the fourth embodiment is formed with an alignment layer 131 similar to the first embodiment.

A color filter 133 formed on the second glass substrate 132 includes black regions 133a, pale red regions 133b, a deep red region 133c, pale green regions 133d, a deep green region 133e, a pale blue region 133f and a deep blue region 133g similarly to that in the aforementioned third embodiment.

Common electrodes 134a an 134b, an alignment layer 135 and liquid crystals 136 are similar in structure to commonthe first embodiment respectively. The common electrodes 134a and 134b are examples of the "first common electrode" and the "second common electrode" in the present invention respectively.

A backlight unit 140 serving as the light source for the transflective main panel 161 is arranged on the rear surface of the first glass substrate 121. This backlight unit 140 includes a cold cathode fluorescent tube 141, a reflector 142 consisting of a metal and a light guide plate 143 consisting of acrylic. An LED 151, a reflector 152 and a light guide plate 153 are set on the rear surface of the second glass substrate 132 for serving as the light source for the reflective sub panel 161 when no or low external light is obtained in the nighttime or the like. When external light is obtained in the daytime or the like, display on the sub panel 162 is made through the external light.

In the main panel 161, light emitted from the backlight unit 140 is incident from the side of the first glass substrate 121, passes through the liquid crystals 136 and the second glass substrate 132. Further, the external light is incident from the side of the second glass substrate 132, passes through the liquid crystals 136 and is reflected by the reflective electrodes 129a toward the second glass substrate 132. Thus, the observer 50 observes the display on the main panel 161 from the side of the second glass substrate 132. In the sub panel 162, light emitted from the LED 151 or the external light is incident from the side of the second glass substrate 132, passes through the liquid crystals 136 and is reflected by the reflective electrodes 129b toward the second glass substrate 132. Thus, the observer 50 also observes the display on the sub panel 162 from the side of the second glass substrate 132.

Figure 6:
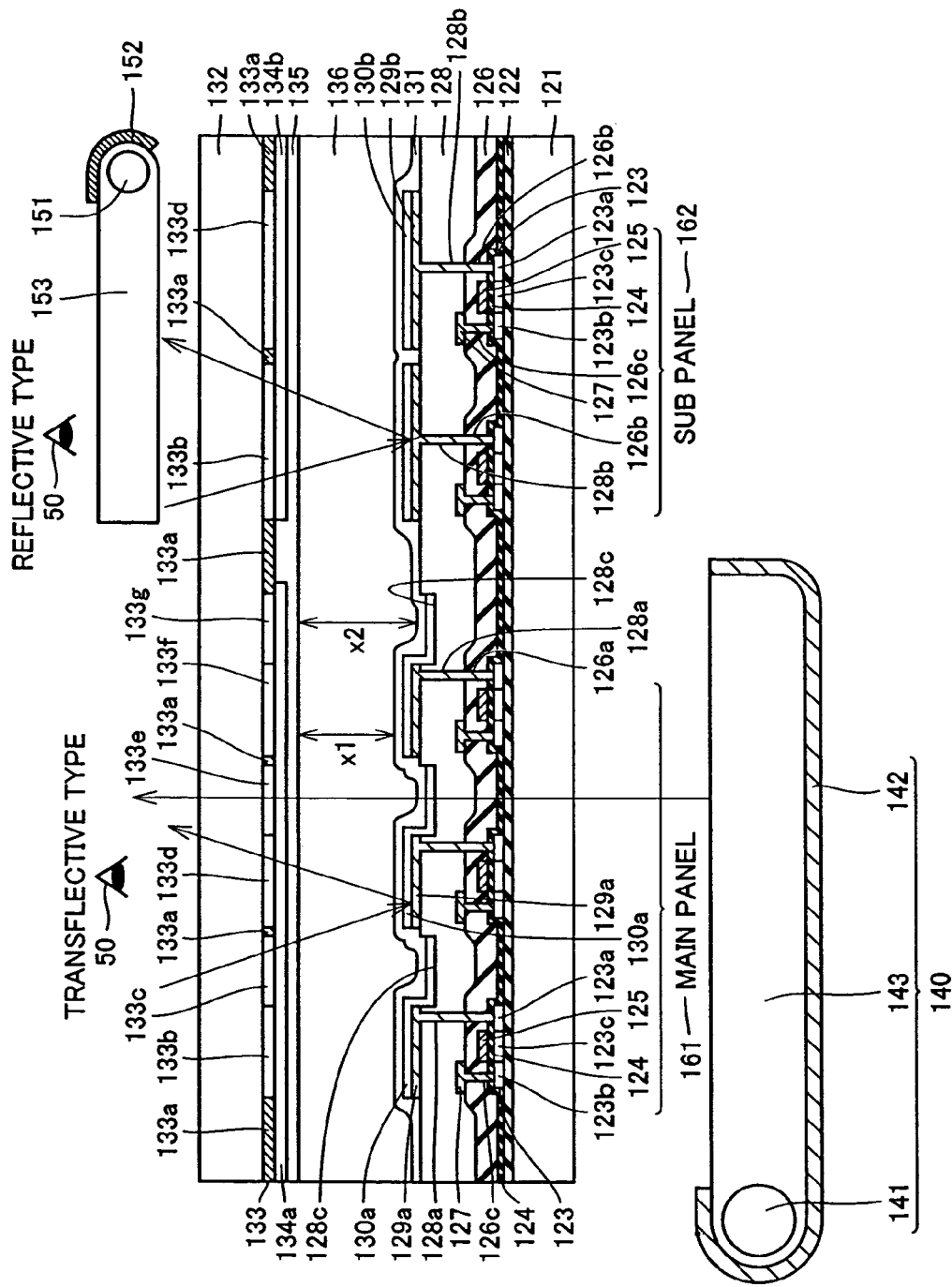
FIG. 6 is a sectional view showing a liquid crystal display including a main panel and a sub panel according to a fourth embodiment of the present invention.
Figure 7:
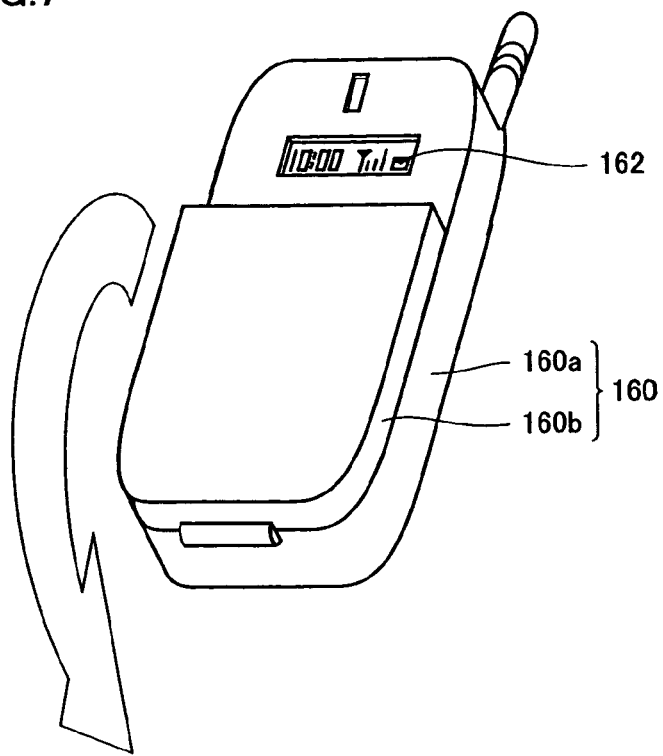
FIGS. 7 and 8 are perspective views showing an exemplary portable telephone including the single-sided liquid crystal display according to the fourth embodiment shown in FIG. 6.
Figure 8:
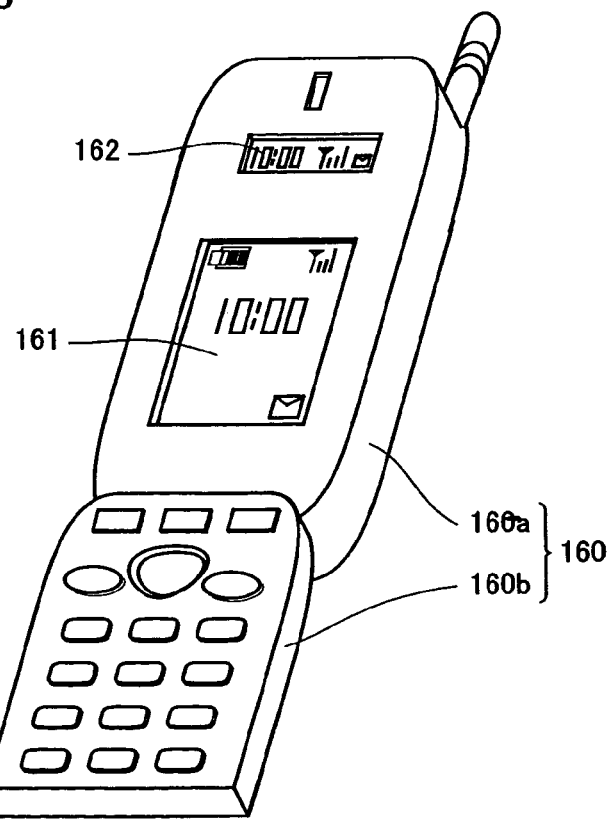

FIGS. 7 and 8 are perspective views showing an exemplary portable telephone 160 including the single-sided liquid crystal display having the main panel 161 and the sub panel 162 according to the fourth embodiment shown in FIG. 6. The exemplary portable telephone 160 shown in FIGS. 7 and 8 is constituted of a display part 160a and an operation part 160b. The display part 160a includes the main panel 161 and the sub panel 162. When the portable telephone 160 is not used, the operation part 160b is folded toward the display part 160a as shown in FIG. 7. In this case, the sub panel 162 displays time information or the like.

When the potable telephone 160 is used, the operation part 160b is opened along arrow in FIG. 7 and brought into the state shown in FIG. 8. In this state, both of the main panel 161 and the sub panel 162 make display. In this case, the main panel 161 displays a dynamic image, a telephone number or the like.

Figure 9:
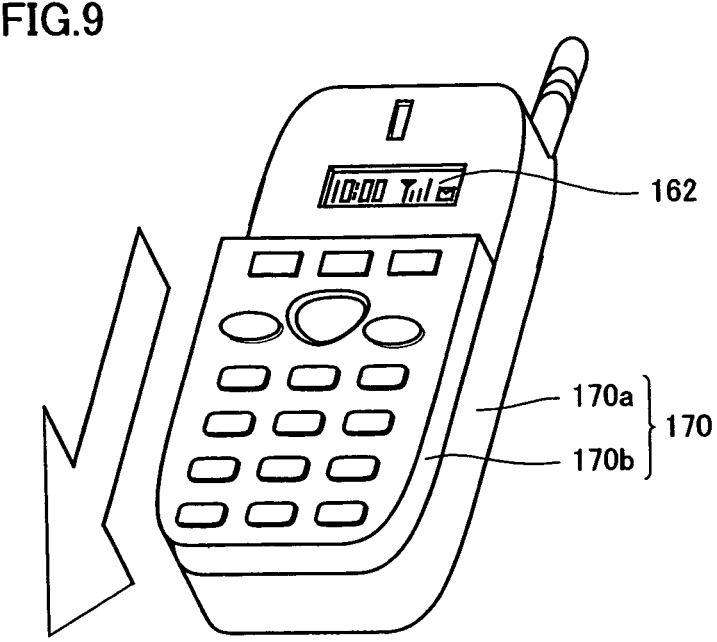
FIGS. 9 and 10 are perspective views showing another exemplary portable telephone including the single-sided liquid crystal display according to the fourth embodiment shown in FIG. 6.
Figure 10:
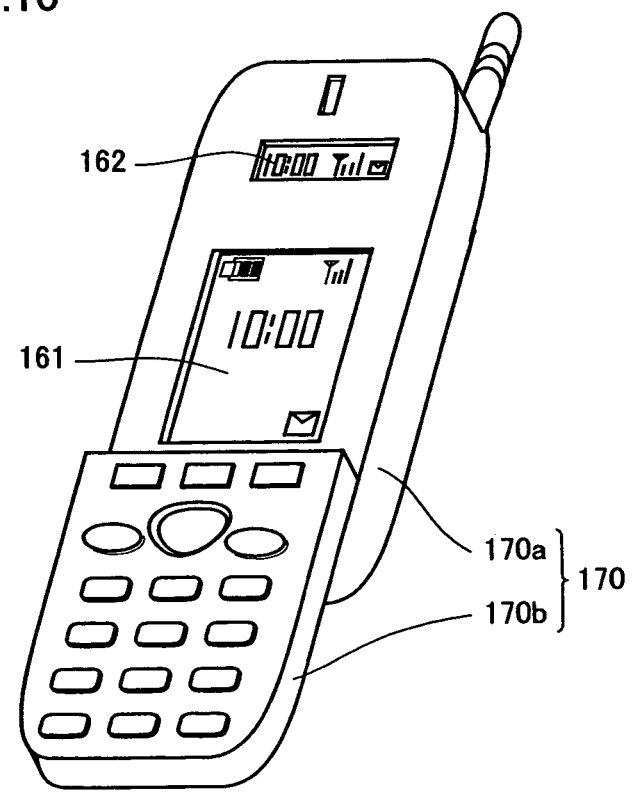

FIGS. 9 and 10 are perspective views showing another exemplary portable telephone 170 including the single-sided liquid crystal display having the main panel 161 and the sub panel 162 according to the fourth embodiment shown in FIG. 6. The exemplary portable telephone 170 shown in FIGS. 9 and 10 is constituted of a display part 170a and an operation part 170b. The operation part 170b is slid along arrow shown in FIG. 9, and brought into the state shown in FIG. 10. Only the sub panel 162 makes display in the state shown in FIG. 9, while both of the main panel 161 and the sub panel 162 make display in the state shown in FIG. 10.

As hereinabove described, the liquid crystal display according to the fourth embodiment is so structured that the observer 50 observes both of the transflective main panel 161 and the sub reflective panel 162 from the side of the second glass substrate 132, whereby the main panel 161 and the sub panel 162 of the single-sided liquid crystal display can be easily formed on the first glass substrate 121.

According to the fourth embodiment, further, the reflective electrodes 129a and 129b of the main panel 161 and the sub panel 162 are formed by the same layer while the transparent electrodes 130a and 130b of the main panel 161 and the sub panel 162 are also formed by the same layer so that pixel electrode forming steps for the main panel 161 and the sub panel 162 can be rendered common, whereby the manufacturing process can be simplified.

According to the fourth embodiment, in addition, the transparent electrodes 130a and 130b consisting of ITO layers or the like are formed on the reflective electrodes 129a and 129b respectively, whereby the upper surfaces of the transparent electrodes 130a and 130b consisting of ITO layers or the like can define pixel electrode surfaces coming into contact with the liquid crystals 136. Thus, characteristics with respect to the liquid crystals 136 can be improved as compared with a case of defining the pixel electrode surfaces coming into contact with the liquid crystals 136 by the upper surfaces of the reflective electrodes 129a and 129b. Consequently, the liquid crystals 136 can be inhibited from deterioration of the characteristics resulting from formation of the reflective electrodes 129a and 129b.

Effects of the fourth embodiment attained by the same structure or method as that in the first, second or third embodiment are similar to those in the first, second or third embodiment.

Fifth Embodiment

Figure 11:
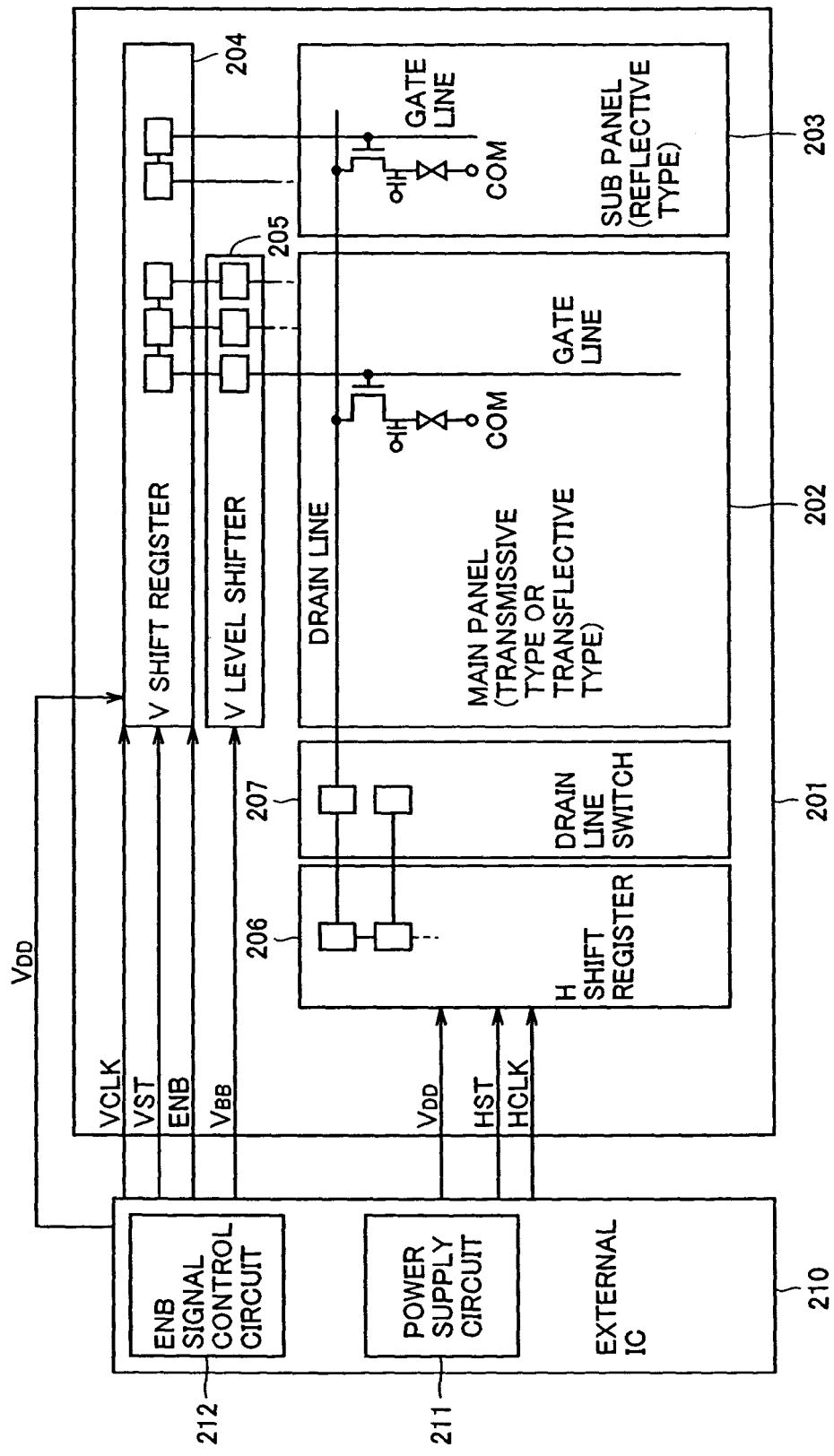
FIG. 11 is a plan view showing a liquid crystal display including a main panel and a sub panel according to a fifth embodiment of the present invention.

Referring to FIG. 11 showing a liquid crystal display according to a fifth embodiment of the present invention, driving circuits arranged around a main panel 202 and a sub panel 203 of the liquid crystal display are described. The main panel 202 and the sub panel 203 are formed on different regions of the same glass substrate 201. The main panel 202 and the sub panel 203 are arranged along the longitudinal direction of drain lines. The main panel 202 is constituted of a transmissive or transflective panel, and the sub panel 203 is constituted of a reflective panel. Thus, the liquid crystal display can display the main panel 202 and the sub panel 203 on opposite surfaces as a double-sided display. The glass substrate 201 is an example of the "substrate" in the present invention. The main panel 202 is an example of the "first display panel" in the present invention, and the sub panel 203 is an example of the "second display panel" in the present invention.

An H shift register 206 for driving (scanning) the drain lines is arranged on a side of the main panel 202 opposite to that provided with the sub panel 203. A drain line switch 207 is arranged between the H shift register 206 and the main panel 202. This drain line switch 207 is provided in order to successively turn on switches in response to a sampling signal thereby successively supplying video signals to the respective drain lines. A V shift register 204 for driving (scanning) gate lines of the main panel 202 and the sub panel 203 is arranged in a direction perpendicular to the longitudinal direction of the gate lines of the main panel 202 and the sub panel 203. A V level shifter 205 for converting the levels of negative voltages of signals supplied to the gate lines of the main panel 202 is arranged between the V shift register 204 and the main panel 202. The V shift register 204 is an example of the "first shift register" in the present invention, and the H shift register 206 is an example of the "second shift register" in the present invention. The V level shifter 205 is an example of the "level shifter" in the present invention.

According to the fifth embodiment, the main panel 202 and the sub panel 203 share the V shift register 204 as well as the H shift register 206. Further, the drain lines are rendered common to the main panel 202 and the sub panel 203. In other words, the drain lines continuously extend from the H shift register 206 to the sub panel 203 through the main panel 202.

An external IC 210 is provided separately from the glass substrate 201 constituting a liquid crystal display panel. The external IC 210 includes a power supply circuit 211 and an ENB signal control circuit 212. The power supply circuit 211 includes a circuit for generating a positive voltage $V_{DD}$ and a circuit for generating a negative voltage $V_{BB}$. Thus, the external IC 210 supplies the positive voltage $V_{DD}$ to the V shift register 204 and the H shift register 206 while supplying the negative voltage $V_{BB}$ to the V level shifter 205. The external IC 210 also supplies a vertical clock signal VCLK, a start signal VST and ENB signals to the V shift register 204. The external IC 210 further supplies a horizontal clock signal HCLK and a start signal HST to the H shift register 206.

The internal structure of the V shift register 204 of the liquid crystal display according to the fifth embodiment is now described with reference to FIG. 12. The V shift register 204 includes shift registers SR1, SR2, SR3, SR4 and SR5. The V shift register 204 also includes AND circuits AND1, AND2, AND3 and AND4 each having three input terminals and one output terminal. Outputs of the shift registers SR1 and SR2 and an ENB signal are input in the input terminals of the AND circuit AND1. Outputs of the shift registers SR2 an SR3 and another ENB signal are input in the input terminals of the AND circuit AND2. Outputs of the shift registers SR3 and SR4 and still another ENB signal are input in the input terminals of the AND circuit AND3. Outputs of the shift registers SR4 and SR5 and a further ENB signal are input in the input terminals of the AND circuit AND4.

Each of the AND circuits AND1, AND2, AND3 and AND4 outputs a high level when all three inputs go high, and outputs a low level when at least one of the three inputs goes low.

The output terminals of the AND circuits AND1 and AND2 are connected to gate lines G1 and G2 respectively. The output terminals of the AND circuits AND3 and AND4 are connected to gate lines G3 and G4 through level shifters 205a and 205b of the V level shifter 205 respectively.

The AND circuits AND1 and AND2 constitute an output shutdown circuit 241 shutting down outputs to the sub panel 203. The AND circuits AND3 and AND4 constitute another output shutdown circuit 242 shutting down outputs to the main panel 202.

Each pixel of the main panel 202 includes a switching transistor 221, a liquid crystal 222 and a storage capacitor 223. The switching transistor 221 has a gate connected to the gate line G3 or G4 and a drain connected to a drain line D1. The source of the switching transistor 221 is connected with a pixel electrode of the liquid crystal 222 and a first electrode of the storage capacitor 223. Each pixel of the sub panel 203 includes a switching transistor 231, a liquid crystal 232 and a storage capacitor 233. The switching transistor 231 has a gate connected to the gate line G1 or G2 and a drain connected to the drain line D1. The source of the switching transistor 231 is connected with a pixel electrode of the liquid crystal 232 and a first electrode of the storage capacitor 233. The storage capacitor 233 has a larger capacitance than the storage capacitor 223 of the main panel 202, in order to hold data of the sub panel 203 having a small number of rewriting times for a constant period.

The main panel 202 is subjected to common electrode AC driving, and the sub panel 203 is subjected to common electrode DC driving. The term "common electrode AC driving" denotes a driving system AC-driving a second electrode (common electrode: COM) different from a first electrode (pixel electrode) of a display pixel to which a video signal is applied thereby substantially halving the amplitude of the video signal. When this common electrode AC driving is employed, the pixel electrode may exhibit a negative potential depending on the potentials of the common electrode (COM) and the video signal. In this case, the switching transistor 221 is turned on if the gate potential thereof is positive or zero, and hence negative voltages must be applied to the gate lines G3 and G4 of the main panel 202. In order to perform common electrode AC driving, therefore, negative voltages level-converted by the V level shifter 205 must be supplied to the gate lines G3 and G4 of the main panel 202.

On the other hand, the term "common electrode DC driving" denotes a driving system setting the common electrode (COM) to a constant voltage, and hence n video signal exhibits a negative potential. Therefore, the gate lines G1 and G2 of the sub panel 203 subjected to common electrode DC driving may not be supplied with negative voltages. According to the fifth embodiment, therefore, the V level shifter 205 is arranged not on a portion corresponding to the gate lines G1 and G2 of the sub panel 203 but only on a portion corresponding to the gate lines G3 and G4 of the main panel 202.

Figure 12:
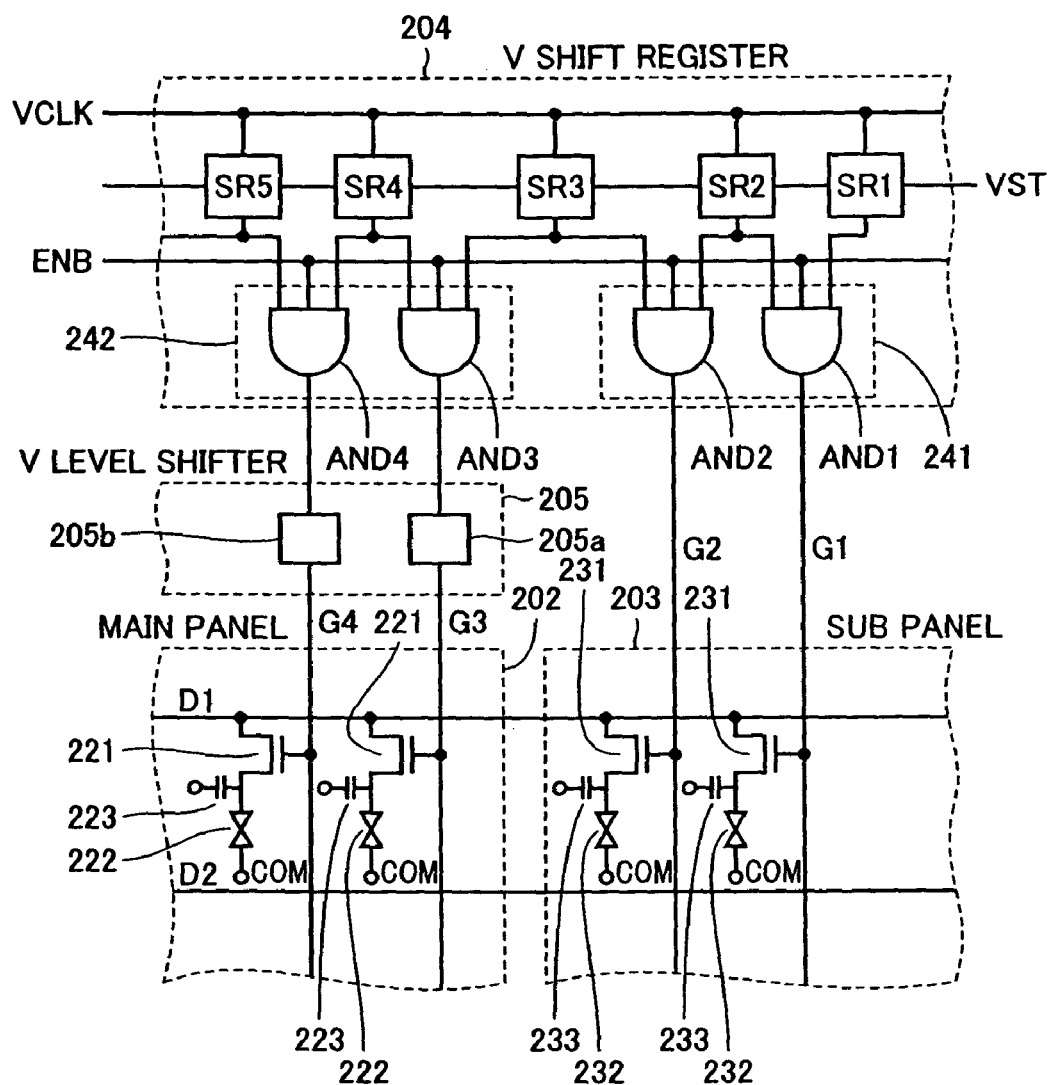
FIG. 12 is a circuit diagram showing the internal structure of a portion around a V shift register of the liquid crystal display according to the fifth embodiment shown in FIG. 11.

While FIG. 12 shows each of the main panel 202 and the sub panel 203 with two rows and one column in order to simplify the illustration, the present invention is applicable to any numbers of rows and columns.

Figure 13:
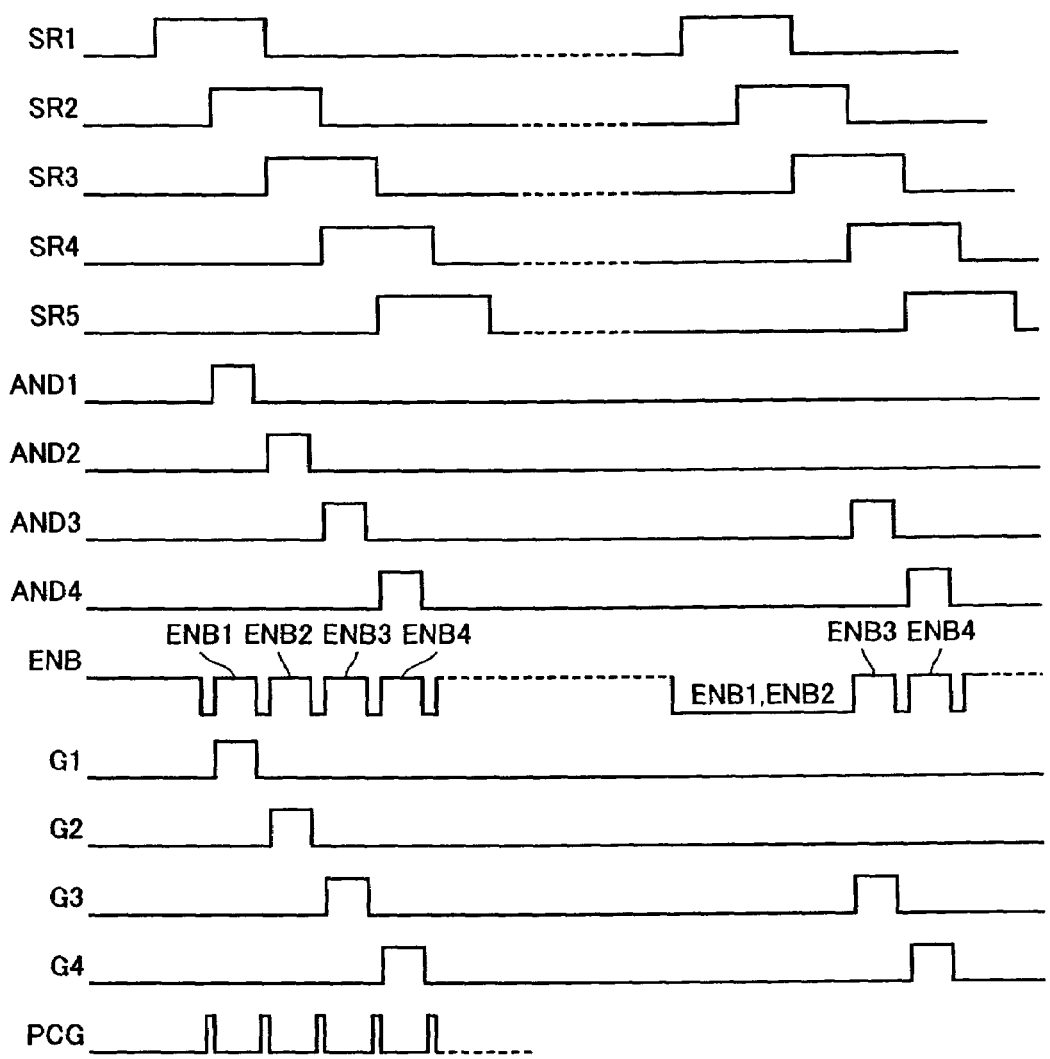
FIG. 13 is a timing chart for illustrating a method of driving the V shift register of the liquid crystal display according to the fifth embodiment shown in FIG. 12.

A method of driving the V shift register 204 of the liquid crystal display according to the fifth embodiment is now described with reference to FIGS. 12 and 13.

The start signal VST (see FIG. 12) starts driving the V shift register 204. As shown in FIG. 13, the shift registers SR1 to SR5 of the V shift register 204 successively go high for constant periods in synchronization with the vertical clock signal VCLK. In this case, high-level ENB signals ENB1 to ENB4 are supplied to the AND circuits AND1 to AND4 receiving the outputs of the shift registers SR1 to SR5 in correspondence to periods when adjacent ones of the shift registers SR1 to SR5 are at high levels together in first scanning. For example, the high-level ENB signal ENB1 is supplied to the AND circuit AND1 in correspondence to the period when the shift registers SR1 and SR2 are at high levels. The ENB signal control circuit 212 stored in the external IC 210 shown in FIG. 11 controls the ENB signals ENB1 to ENB4. Thus, the outputs of the AND circuits AND1, AND2, AND3 and AND4 go high for constant periods respectively in the first scanning, as shown in FIG. 13. Therefore, all of the gate lines G1, G2, G3 and G4 go high for constant periods respectively in the first scanning.

The ENB signals ENB1 to ENB4 are generally employed for not turning on pixel transistors (the switching transistors 221 and 231) in a precharge period. The drain lines are precharged in order to previously set the drain lines to certain degrees of voltages so that video signals may be slightly added. According to the fifth embodiment, the ENB signals ENB1 to ENB4 are employed as control signals for changing rewrite cycles for the main panel 202 and the sub panel 203 or shutting down the sub panel 203 or the main panel 202.

The gate lines G1 and G2 corresponding to the sub panel 203 go high in the aforementioned first scanning, thereby turning on the switching transistors 231 of the sub panel 203. Thus, a video signal supplied to the drain line D1 is supplied to the pixel electrodes of the liquid crystals 232 and the storage capacitors 233 through the switching transistors 231. Consequently, display is made on the corresponding pixels of the sub panel 203.

For the switching transistors 221 of the main panel 202, the outputs of the AND circuits AND3 and AND4 are supplied to the gate lines G3 and G4 through the level shifters 205a and 205b of the V level shifter 205. When the outputs of the AND circuits AND3 and AND4 are high, the gate lines G3 and G4 are supplied with the same high-level voltages through the level shifters 205a and 205b of the V level shifter 205. Thus, the switching transistors 221 enter ON states. The drain line D1 is supplied with a video signal for the main panel 202 in this state, so that the video signal is supplied to the pixel electrodes of the liquid crystals 222. Thus, display is made on the corresponding pixels of the main panel 202.

While no data are supplied to the pixels of the main panel 202, the outputs of the AND circuits AND3 and AND4 go low and the gate lines G3 an G4 are supplied with negative voltages level-converted by the level shifters 205a and 205b.

According to the fifth embodiment, the outputs of the AND circuits AND1 and AND2 corresponding to the sub panel 203 are forcibly brought into low levels in second or later scanning of the gate lines by the V shift register 204. In other words, the ENB signals ENB1 and ENB2 are brought into low levels in second or later scanning of the gate lines of the sub panel 203 as show in FIG. 13, thereby forcibly bringing the outputs of the AND circuits AND1 and AND2 corresponding to the sub panel 203 into low levels. Thus, outputs to the gate lines G1 and G2 are shut down in the second or later scanning of the gate lines by the V shift register 204. In this case, the switching transistors 231 are turned off, to write no video signal. In other words, the AND circuits AND1 and AND2 constitute the output shutdown circuit 241 in this case.

In the sub panel 203, the ENB signals ENB1 and ENB2 are brought into high levels for constant periods at the rate of about 10 to 50 times per second (about 10 Hz to 50 Hz) for turning on the switching transistors 231 about 10 to 50 times per second, thereby writing video signals in the liquid crystals 232 of the sub panel 203 about 10 to 50 times per second.

On the other hand, the ENB signals ENB3 and ENB4 are brought into high levels for constant periods also in second or later scanning similarly to the first scanning thereby outputting high levels to the gate lines G3 and G4 of the main panel 202 for constant periods. Thus, the switching transistors 221 of the main panel 202 are turned on for writing video signals in the liquid crystals 222.

When both of the main panel 202 and the sub panel 203 are used in the fifth embodiment, as hereinabove described, the main panel 202 displaying dynamic images or the like is regularly driven at a high frequency (about 60 Hz) while display on the sub panel 203 is rewritten at a frequency (about 10 Hz to about 50 Hz) of about 10 times to 50 times per second. In this case, flicker or ununiformity on display easily appears if the number of rewriting times for the liquid crystals 232 of the sub panel 203 is reduced, and hence the storage capacitors 233 having a large capacitance are provided for the pixels of the sub panel 203 to be capable of holding video data for constant periods. The storage capacitors 233 preferably have a capacitance of at least three times the capacitance of the storage capacitors 223 of the main panel 202. The storage capacitors 233 of the sub panel 203 having a capacitance of about three to four times the capacitance of the storage capacitors 223 of the main panel 202 can be easily formed in consideration of the layout of the sub panel 203. In this case, the display on the sub panel 203 is preferably rewritten at a frequency (about 15 Hz to about 20 Hz) of about 15 to 20 times per second.

When only the main panel 202 is used, the ENB signals ENB1 and ENB2 corresponding to the sub panel 203 may be regularly brought into low levels. In this case, the outputs of the AND circuits AND1 and AND2 regularly go low, thereby regularly holding the gate lines G1 and G2 at low levels. Thus, the switching transistors 231 are regularly in OFF states, to write no data in the liquid crystals 232 of the sub panel 203. In this case, the liquid crystal display makes display not on the sub panel 203 but only on the main panel 202. The AND circuits AND1 and AND2 constitute the output shutdown circuit 241 in this case.

When only the sub panel 203 is used, the ENB signals ENB3 and ENB4 corresponding to the main panel 202 may be regularly brought into low levels. In this case, the outputs of the AND circuits AND3 and AND4 regularly go low thereby regularly holding the gate lines G3 and G4 at low levels (negative voltages). Thus, the switching transistors 221 are regularly in OFF states, to write no data in the liquid crystals 222 of the main panel 202. In this case, the liquid crystal display makes display not on the main panel 202 but only on the sub panel 203. The AND circuits AND3 and AND4 constitute the output shutdown circuit 242 in this case.

According to the fifth embodiment, as hereinabove described, the main panel 202 and the sub panel 203 are provided on the same glass substrate 201 while sharing the V shift register 204 and the H shift register 207, whereby the liquid crystal display can be further miniaturized as compared with that having a main panel and a sub panel formed on different glass substrates. Further, the main panel 202 and the sub panel 203 share the glass substrate 201, the V shift register 204 and the H shift register 206, whereby the number of components can be further reduced and assembling steps can be further simplified. Thus, the component cost as well as the device cost can be further reduced.

According to the fifth embodiment, further, the drain lines are so rendered common to the main panel 202 and the sub panel 203 that the number thereof can be reduced. Thus, power consumption can be reduced and a narrow frame can be obtained.

According to the fifth embodiment, in addition, the V level shifter 205 is provided only on the portion corresponding to the main panel 202, whereby power consumption can be reduced.

According to the fifth embodiment, further, the output shutdown circuit 241 is provided for shutting down the output of the portion of the V shift register 204 corresponding to the sub panel 203 so that the output shutdown circuit 241 can lengthen only the rewrite cycle of the sub panel 203 when the main panel 202 displaying dynamic images or the like and requiring a large number of data rewriting times and the sub panel 203 displaying no dynamic images or the like and requiring only a small number of data rewriting times share the V shift register 204. Consequently, only the number of data rewriting times of the sub panel 203 can be reduced while keeping the main panel 202 at a large number of data rewriting times also when the main panel 202 and the sub panel 203 share the V shift register 204.

According to the fifth embodiment, further, the sub panel 203 can be easily brought into an unused state by regularly setting the ENB signals ENB1 and ENB2 to low levels for shutting down the output from the output shutdown circuit 241 (bringing the same into a low level) when only the main panel 202 is used without using the sub panel 203. When only the sub panel 203 is used without using the main panel 202, on the other hand, the main panel 202 can be easily brought into an unused state by regularly setting the ENB signals ENB3 and ENB4 to low levels for shutting down the output from the output shutdown circuit 242 (bringing the same into a low level).

Sixth Embodiment

Figure 14:
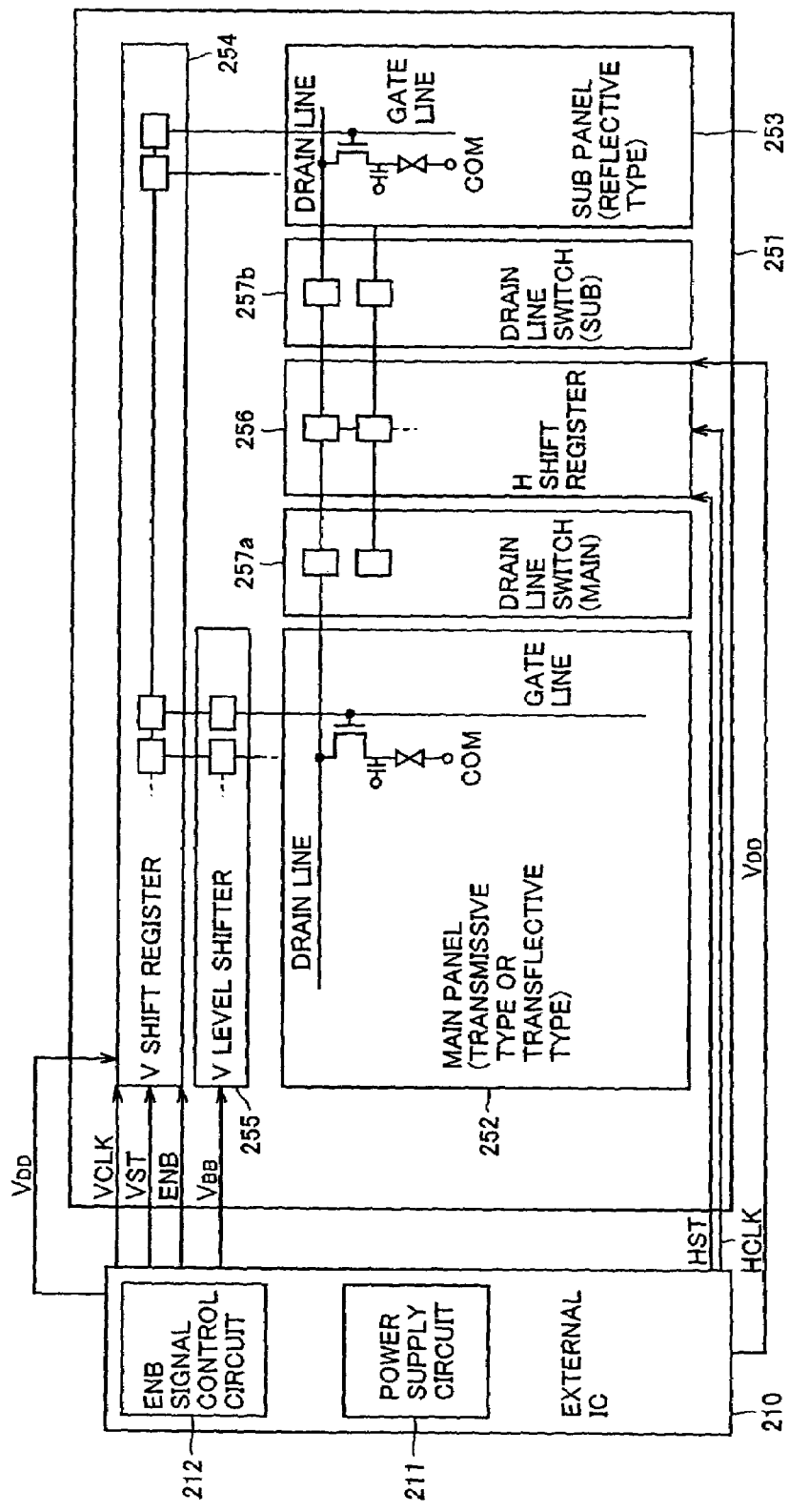
FIG. 14 is a plan view showing a liquid crystal display including a main panel and a sub panel according to a sixth embodiment of the present invention.

In a liquid crystal display according to a sixth embodiment of the present invention, an H shift register 256 is arranged between a main panel 252 and a sub panel 253, dissimilarly to the aforementioned fifth embodiment. Portions of the sixth embodiment different from those of the aforementioned fifth embodiment are now described in detail with reference to FIG. 14.

According to the sixth embodiment, a glass substrate 251, the main panel 252 consisting of a transmissive or transflective panel and the sub panel 253 consisting of a reflective panel are identical in structure to the glass substrate 201, the main panel 202 and the sub panel 203 of the liquid crystal display according to the fifth embodiment shown in FIG. 11 respectively. The glass substrate 251 is an example of the "substrate" in the present invention. The main panel 252 is an example of the "first display panel" in the present invention, and the sub panel 253 is an example of the "second display panel" in the present invention.

According to the sixth embodiment, the H shift register 256 is arranged between the main panel 252 and the sub panel 253. A drain line switch 257a for the main panel 252 is arranged between the H shift register 256 and the main panel 252. Another drain line switch 257b for the sub panel 253 is arranged between the H shift register 256 and the sub panel 253. The drain line switches 257a and 257b are provided for successively turning on switches in response to a sampling signal thereby successively supplying video signals to respective drain lines. The main panel 252 and the sub panel 253 share the H shift register 256.

The H shift register 256 is an example of the "second shift register" in the present invention. The main panel 252, the sub panel 253, a V shift register 254 and a V level shifter 255 are similar in internal structure to the main panel 202, the sub panel 203, the V shift register 204 and the V level shifter 205 according to the aforementioned fifth embodiment respectively.

An external IC 210 supplies a horizontal clock signal HCLK, a start signal HST and a positive voltage $V_{DD}$ to the H shift register 256.

According to the sixth embodiment, the V shift register 254 is driven by a method similar to that for the V shift register 204 according to the aforementioned fifth embodiment.

According to the sixth embodiment, as hereinabove described, the H shift register 256 driving the drain lines of the main panel 252 and the sub panel 253 is so arranged between the main panel 252 and the sub panel 253 that the distance between the shift register 256 and the sub panel 253 is reduced as compared with that in the fifth embodiment shown in FIG. 11, whereby loads on the drain lines of the sub panel 253 are reduced. Thus, transistors constituting the drain line switch 257b for the sub panel 253 can be reduced in size.

According to the sixth embodiment, further, the main panel 252 and the sub panel 253 are provided on the same glass substrate 251 while sharing the V shift register 254 and the H shift register 256 similarly to the aforementioned fifth embodiment, whereby the liquid crystal display can be further miniaturized as compared with that having a main panel and a sub panel formed on different glass substrates. Further, the main panel 252 and the sub panel 253 share the glass substrate 251, the V shift register 254 and the H shift register 256, whereby the number of components can be further reduced and assembling steps can be further simplified. Thus, the component cost as well as the device cost can be further reduced.

Effects of the sixth embodiment attained by the same structure or method as that in the fifth embodiment are similar to those in the aforementioned fifth embodiment.

Seventh Embodiment

Figure 15:
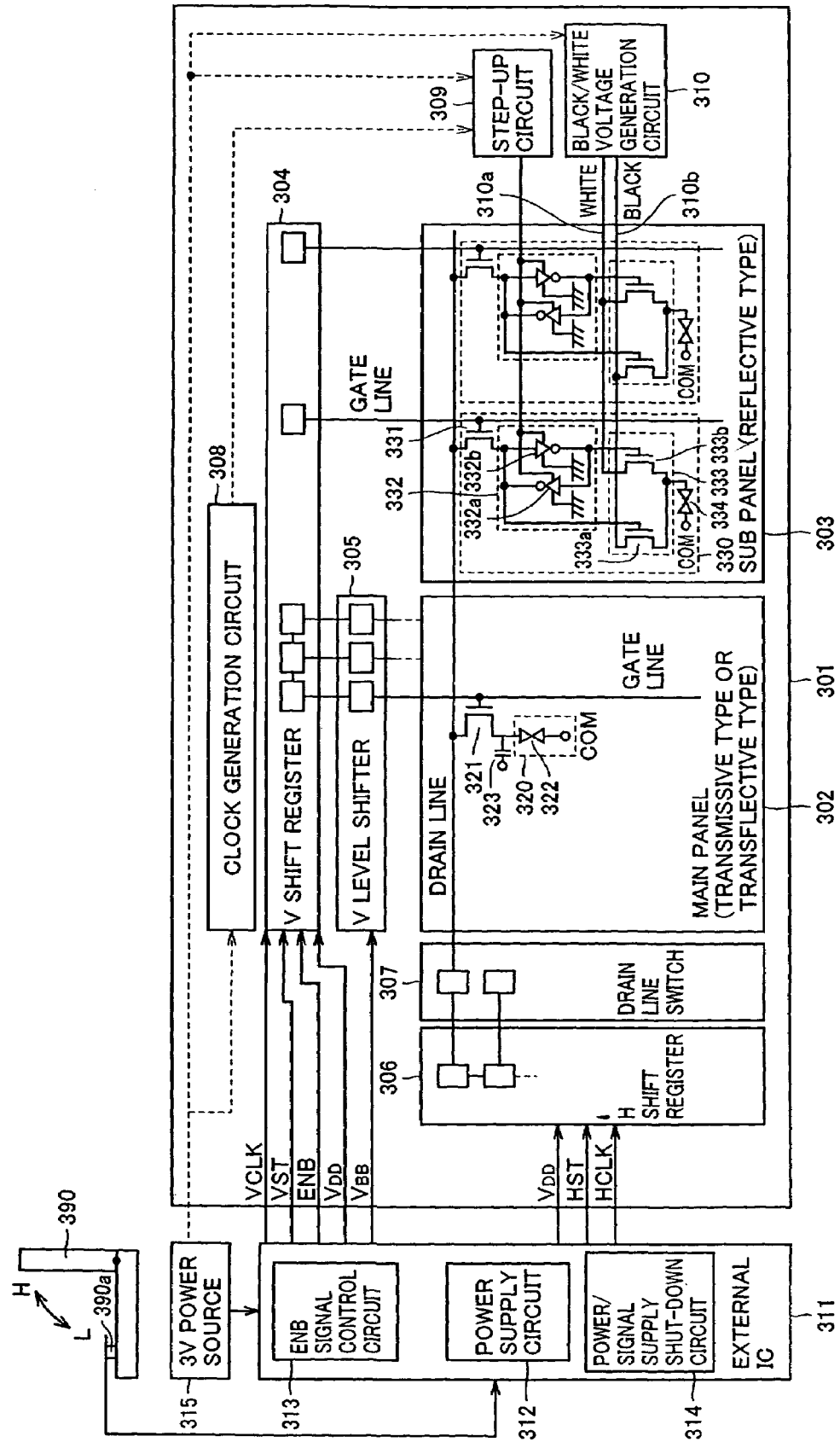
FIG. 15 is a plan view showing a liquid crystal display including a main panel and a sub panel according to a seventh embodiment of the present invention.

Referring to FIG. 15, points of a liquid crystal display according to a seventh embodiment of the present invention different from those of the liquid crystal display according to the aforementioned fifth or sixth embodiment are now described. A glass substrate 301, a main panel 302 consisting of a transmissive or transflective panel and a sub panel 303 consisting of a reflective panel according to the seventh embodiment are identical in structure to the glass substrate 201, the main panel 202 and the sub panel 203 according to the fifth embodiment shown in FIG. 11 respectively.

The glass substrate 301 is an example of the "substrate" in the present invention. The main panel 302 is an example of the "first display panel" in the present invention, and the sub panel 303 is an example of the "second display panel" in the present invention.

An H shift register 306 for driving (scanning) drain lines is arranged on a side of the main panel 302 opposite to that provided with the sub panel 303. The main panel 302 and the sub panel 303 share the H shift register 306. A drain line switch 307 is arranged between the H shift register 306 and the main panel 302. This drain line switch 307 is provided for successively turning on switches in response to a sampling signal thereby successively supplying video signals to respective drain lines.

The liquid crystal display according to the seventh embodiment is also provided with a V shift register 304 and a V level shifter 305 having structures similar to those of the V shift register 204 and the V level shifter 205 according to the fifth embodiment (see FIG. 12) respectively.

The V shift register 304 and the H shift register 306 are examples of the "signal line driving circuit" in the present invention, and the H shift register 306 is an example of the "second shift register" in the present invention.

According to the seventh embodiment, a clock generation circuit 308, a step-up circuit 309 and a black/white voltage generation circuit 310 are provided on the glass substrate 301. The clock generation circuit 308, the step-up circuit 309 and the black/white voltage generation circuit 310 are examples of the "second display panel driving circuit" in the present invention. The clock generation circuit 308 constituted of a ring oscillator generates a clock signal for performing a step-up operation in the step-up circuit 309. The step-up circuit 309 supplies an increased voltage (about 5 V to about 5.5 V) to SRAMs (static random access memories)

332 described later. The black/white voltage generation circuit 310 switches a low level (0 V) and a high level (3 V) at a constant cycle and supplies the same to a white (=COM) power supply line 310a and a black power supply line 310b respectively.

According to the seventh embodiment, each pixel of the sub panel 303 includes a switching transistor 331, the SRAM (static random-access memory) 332, a signal selection circuit 333 and a liquid crystal 334. In other words, each pixel of the sub panel 303 stores the SRAM 332 in the seventh embodiment. This SRAM 332 is constituted of two inverter circuits 332a and 332b. Each signal selection circuit 333 is constituted of two N-channel transistors 333a and 333b. The sub reflective panel 303 is provided with display pixel regions 330 on regions formed with reflective electrodes (not shown) thereof. Therefore, each display pixel region 330 of the sub panel 303 covers each switching transistor 331, each SRAM 332 and each signal selection circuit 333.

Each switching transistor 331 has a drain connected with a drain line and a gate connected with a gate line. The inverter circuit 332b is forwardly connected to the source of the switching transistor 331. The inverter circuit 332a is forwardly connected between an output side of the inverter circuit 332b and the source of the switching transistor 331. The step-up circuit 309 serving as a power source is connected to each pair of inverter circuits 332a and 332b.

The signal selection circuit 333 is provided between the SRAM 332 and a pixel electrode of the liquid crystal 334. This signal selection circuit 333 selects a signal to be output to the pixel electrode of the liquid crystal 334 in response to a signal supplied from the SRAM 332. The black/white generation circuit 310 is connected to the drain of the N-channel transistor 333a of the signal selection circuit 333 through the black power supply line 310b. The black/white voltage generation circuit 310 is also connected to the drain of the N-channel transistor 333b through the white power supply line 310a. Outputs of the inverter circuits 332a and 332b are connected to the gates of the N-channel transistors 333a and 333b respectively.

Each pixel of the main panel 302 includes a switching transistor 321, a liquid crystal 322 and a storage capacitor 323 having structures similar to those of the switching transistor 221, the liquid crystal 222 and the storage capacitor 223 according to the fifth embodiment shown in FIG. 12 respectively.

Figure 16:
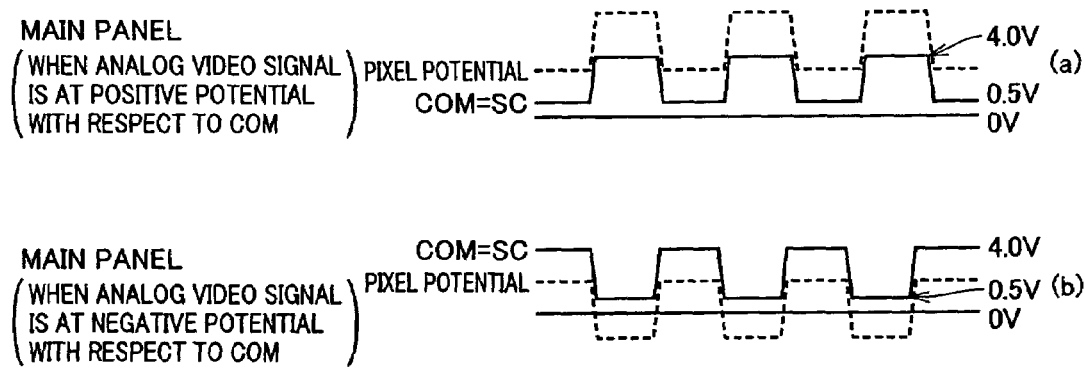
FIG. 16 is a waveform diagram in a case of performing common electrode AC driving on the main panel of the liquid crystal display according to the seventh embodiment shown in FIG. 15.
Figure 17:
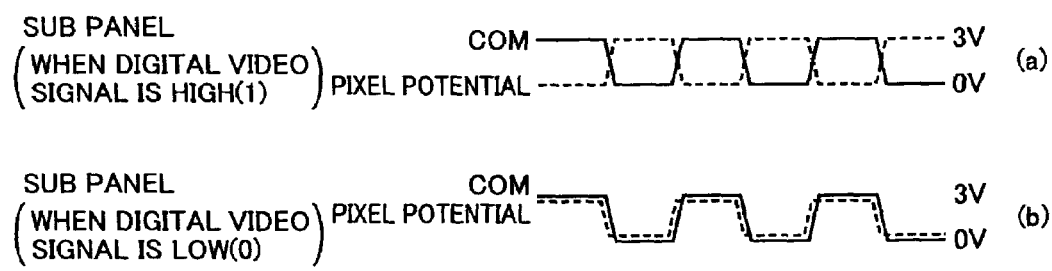
FIG. 17 is a waveform diagram in a case of performing common electrode AC driving on the sub panel of the liquid crystal display according to the seventh embodiment shown in FIG. 15.

According to the seventh embodiment, the main panel 302 and the sub panel 303 are subjected to common electrode AC driving. FIG. 16 is a waveform diagram in a case of performing common electrode AC driving on the main panel 302 displaying analog video signals, and FIG. 17 is a waveform diagram in a case of performing common electrode AC driving on the sub panel 303 displaying digital video signals. As shown in FIG. 16, each pixel electrode may exhibit a negative potential depending on the potentials of a common electrode (COM) and each video signal when common electrode AC driving is performed on the main panel 302 displaying analog video signals. In this case, the switching transistor 321 of the main panel 302 is turned on if the gate potential thereof is positive or zero, and hence a negative voltage must be applied to each gate line of the main panel 302.

In the sub panel 303 displaying digital video signals, on the other hand, a signal held by the SRAM 332 exhibits no negative potential also when the same is subjected to common electrode AC driving, as shown in FIG. 17. Therefore, no negative voltage may be supplied to each gate line of the sub panel 303. According to the seventh embodiment, therefore, the V level shifter 305 is arranged not on a portion corresponding to the sub panel 303 but only on a portion corresponding to the main panel 302.

An external IC 311 and a 3 V power source 315 are provided separately from the glass substrate 301 constituting a liquid crystal display panel. The external IC 311 includes a power supply circuit 312, an ENB signal control circuit 313 and a power/signal supply shutdown circuit 314. The power supply circuit 312 is an example of the "first power supply circuit" in the present invention, and the 3 V power source 315 is an example of the "second power supply circuit" in the present invention. The power supply circuit 312 includes circuits for generating positive and negative voltages $V_{DD}$ and $V_{BB}$ respectively. Thus, the external IC 311 supplies the positive voltage $V_{DD}$ to the V shift register 304 and the H shift register 306, while supplying the negative voltage $V_{BB}$ to the V level shifter 305. The external IC 311 also supplies a vertical clock signal VCLK, a start signal VST and ENB signals to the V shift register 304. The external IC 311 further supplies a horizontal clock signal HCLK and a start signal HST to the H shift register 306.

The ENB signal control circuit 313 is provided for controlling high or low levels of the ENB signals supplied in scanning by the V shift register 304. The power/signal supply shutdown circuit 314 is provided for shutting down supply of power and signals to the V shift register 304 and the H shift register 306 when only the sub panel 303 is used while the SRAMs 332 hold signals.

Figure 18:
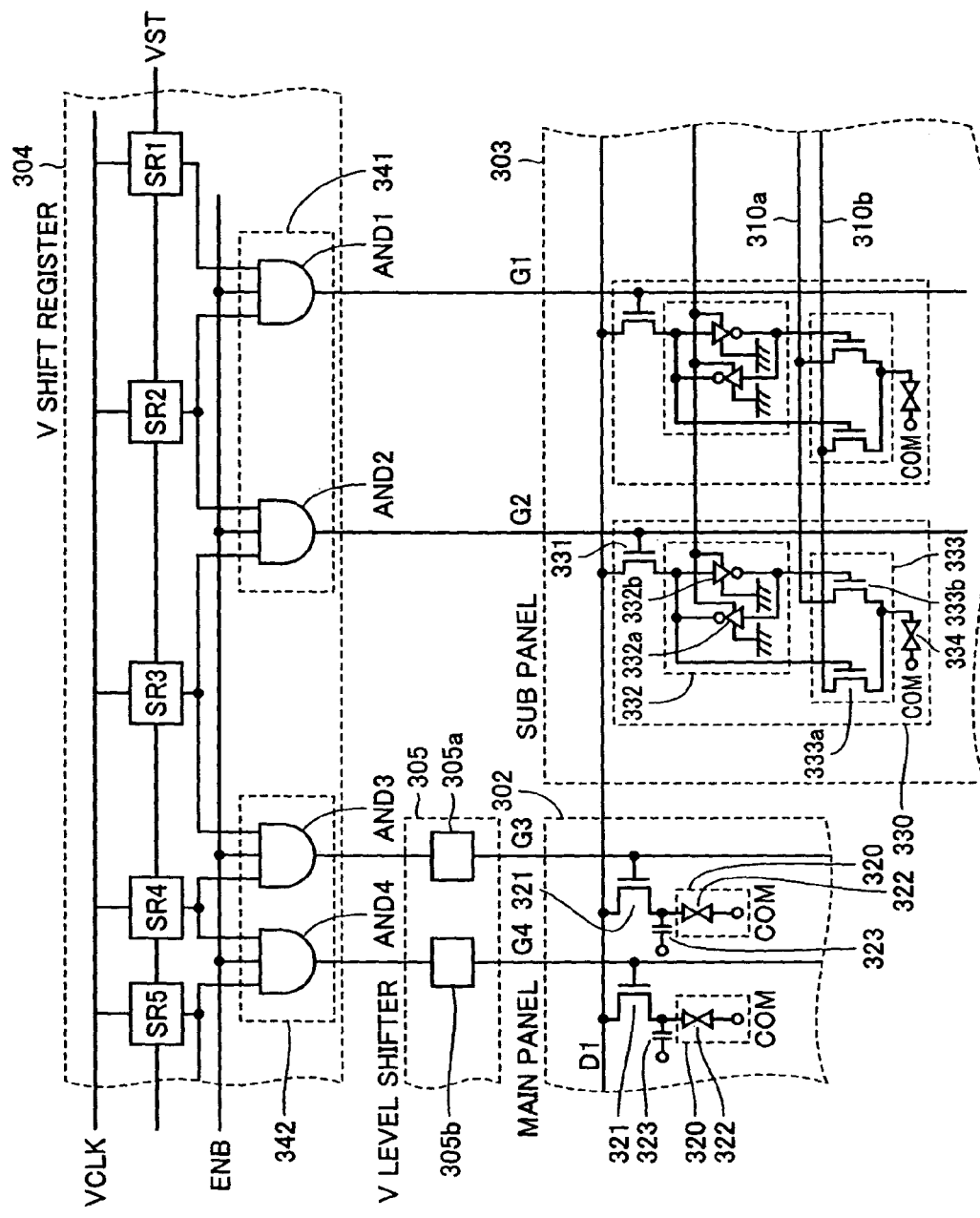
FIG. 18 is a circuit diagram showing the internal structure of a portion around a V shift register of the liquid crystal display according to the seventh embodiment shown in FIG. 15.

Referring to FIG. 18, AND circuits AND1 and AND2 of the V shift register 304 constitute an output shutdown circuit shutting down outputs to the sub panel 303 in scanning. Further, AND circuits AND3 and AND4 constitute another output shutdown circuit 342 shutting down outputs to the main panel 302 in scanning.

In order to drive the V shift register 304 of the liquid crystal display according to the seventh embodiment shown in FIG. 18, gate lines G1 and G2 corresponding to the sub panel 303 are brought into high levels in first scanning of the sub panel 303 and the main panel 302 thereby turning on the switching transistors 331 of the sub panel 303, similarly to the aforementioned fifth embodiment. Thus, a high- or low-level signal supplied to a drain line D1 is supplied to the SRAMs 332 through the switching transistors 331. The SRAMs 332 hold this signal. When the signal held by the SRAMs 332 is high, the N-channel transistors 333a and 333b are turned on and off respectively. Thus, the black power supply line 310b supplies a black voltage to the pixel electrodes of the liquid crystals 334 through the N-channel transistors 333a, whereby the liquid crystals 334 make black display.

According to the seventh embodiment, outputs of the AND circuits AND1 and AND2 corresponding to the sub panel 303 are forcibly brought into low levels in second or later scanning of the gate lines by the V shift register 304, similarly to the aforementioned fifth embodiment. In other words, ENB signals ENB1 and ENB2 are brought into low levels as shown in FIG. 13 in second or later scanning of the gate lines of the sub panel 303, thereby forcibly bringing the outputs of the AND circuits AND1 and AND2 corresponding to the sub panel 303 to low levels. Thus, outputs to the gate lines G1 and G2 are shut down in second or later scanning of the gate lines by the V shift register 304. In this case, the switching transistors 331 are turned off, to write no signal in the SRAMs 332. In other words, the AND circuits AND1 and AND2 constitute the output shutdown circuit 341 in this case.

In the sub panel 303, the ENB signals ENB1 and ENB2 are brought into high levels for constant periods at the rate of about once per second. Thus, the switching transistors 331 enter ON states only about once per second, thereby supplying signals to the SRAMs 332 only about once per second. In other words, the sub panel 303 is scanned at a frequency (about 1 Hz) of about once per second regardless of the scanning frequency (about 60 Hz) of the V shift register 304.

In the main panel 302, on the other hand, ENB signals ENB3 and ENB4 are brought into high levels for constant periods also in second or later scanning similarly to first scanning, thereby outputting high levels to gate lines G3 and G4 for constant periods. Thus, the switching transistors 321 of the main panel 302 enter ON states for writing analog video signals in the liquid crystals 322 of the main panel 302. In other words, the main panel 302 is scanned at the scanning frequency (about 60 Hz) of the V shift register 304.

According to the seventh embodiment, as hereinabove described, the main panel 302 displaying dynamic images or the like is regularly driven at a high scanning frequency (about 60 Hz) and the sub panel 303 is driven at a low frequency (about 1 Hz) of about once per second when both of the main panel 302 and the sub panel 303 are used. In this case, the SRAMs 332 stored in the sub panel 303 as data holding circuits reliably hold signals in a period up to subsequent scanning also when the scanning frequency for the sub panel 303 is reduced and a rewrite cycle is lengthened.

Operations in a case of using only the main panel 302 without using the sub panel 303 are now described. In this case, the ENB signals ENB1 and ENB2 corresponding to the sub panel 303 are regularly set to low levels. Thus, the outputs of the AND circuits AND1 and AND2 regularly go low, thereby regularly holding the gate lines G1 and G2 at low levels. Therefore, the switching transistors 331 regularly enter OFF states, to supply no signal to the SRAMs 332 of the sub panel 303. When power sources for and black/white signals to the SRAMs 332 are turned off, the sub panel 303 makes no display. In this case, the AND circuits AND1 and AND2 constitute the output shutdown circuit 341 of the sub panel 303. In the main panel 302, the ENB signals ENB3 and ENB4 are brought into high levels for constant periods in all scanning. Thus, only the main panel 302 makes display.

Operations in a case of using only the sub panel 303 without using the main panel 302 are now described. In this case, the ENB signals ENB3 and ENB4 corresponding to the main panel 302 are regularly brought into low levels. Thus, the switching transistors 321 of the main panel 302 regularly enter OFF states, to write no analog video signal in the liquid crystals 322 of the main panel 302. In this case, the AND circuits AND3 and AND4 constitute the output shutdown circuit 342 of the main panel 302. In the sub panel 303, the ENB signals ENB1 and ENB2 are brought into high levels for constant periods at the rate of about once per second. In other words, each SRAM 332 is supplied with a signal only about once per second, so that only the sub panel 303 makes black or white display.

When only the sub panel 303 is used while the SRAMs 332 hold data, the power/signal shutdown circuit 314 (see FIG. 15) of the external IC 311 is so employed as to shut down supply of the power ($V_{DD}$ and $V_{BB}$) and the signals (VCLK, VST, ENB, HCLK an HST) from the external IC 311 to the V shift register 304, the V level shifter 305 and the H shift register 306. The 3 V power source 315 supplies power only through paths shown by dotted lines in FIG. 15.

The external IC circuit 311 detects whether or not the main panel 302 and the sub panel 303 are used on the basis of an opening/closing detection switch 390a of a portable telephone 390 shown in FIG. 15. More specifically, an output from the opening/closing detection switch 390a goes low when the portable telephone 390 is folded and the main panel 302 is not used, and hence the external IC 311 detects that only the sub panel 303 is used. When the portable telephone 390 is opened for using the main panel 302, the output from the opening/closing detection switch 390a goes high and hence the external IC 311 detects that the main panel 302 and the sub panel 303 are used.

The present invention is applicable not only to the portable telephone 390 but also to various portable apparatuses and displays. The present invention is not restricted to the opening/closing detection switch 390a either, but is also applicable to a switch arbitrarily switchable by a panel user.

According to the seventh embodiment, as hereinabove described, the main panel 302 and the sub panel 303 are provided on different regions of the same glass substrate 301 so that the liquid crystal display can be further miniaturized as compared with that having a main panel and a sub panel formed on different glass substrates. Further, the main panel 302 and the sub panel 303 share the glass substrate 301, the V shift register 304 and the H shift register 306, whereby the number of components can be further reduced and assembling steps can be further simplified. Thus, the component cost as well as the device cost can be further reduced.

According to the seventh embodiment, further, each pixel of the sub panel 303 stores the SRAM 332 so that the SRAM 332 can reliably hold a signal without reduction of the signal voltage in a period up to subsequent scanning also when the scanning frequency for the sub panel 303 is reduced and the rewrite cycle of the sub panel 303 is lengthened as hereinabove described, whereby flicker or ununiformity on display resulting from reduction of the signal voltage can be effectively prevented. Thus, the scanning frequency for the sub panel 303 can be rendered smaller than that for the main panel 302.

According to the seventh embodiment, in addition, the sub panel 303 stores the SRAMs 332 for holding digital video signals so that the SRAMs 332 hold the digital video signals, whereby data of the sub panel 303 may hardly be rewritten. Thus, the power/signal supply shutdown circuit 314 can shut down supply of the power and driving signals to the V shift register 304, the V level shifter 305 and the H shift register 306 when only the sub panel 303 is used while the SRAMs 323 of the sub panel 303 hold signals, whereby power consumption can be reduced.

According to the seventh embodiment, further, power supply from the power supply circuit 312 is stopped so that only the 3 V power source 315 supplies power when only the sub panel 303 is used while the SRAMs 332 of the sub panel 303 hold signals, whereby the small 3 V power source 315 can be employed when only the sub panel 303 is used. Thus, power consumption can be reduced also by this.

According to the seventh embodiment, further, the liquid crystal display is provided with the signal selection circuits 333 selecting the digital video signals supplied to the pixel electrodes of the liquid crystals 334 in response to signals from the SRAMs 332, whereby digital video signals corresponding to data held in the SRAMs 332 can be easily supplied to the pixel electrodes of the liquid crystals 334 of the sub panel 303.

According to the seventh embodiment, further, the drain lines are rendered common to the main panel 302 and the sub panel 303, whereby the number of the drain lines can be reduced. Thus, power consumption can be reduced and a narrow frame can be obtained.

Effects of the seventh embodiment attained by the same structure or method as that in the fifth or sixth embodiment are similar to those of the aforementioned fifth or sixth embodiment.

Eighth Embodiment

Figure 19:
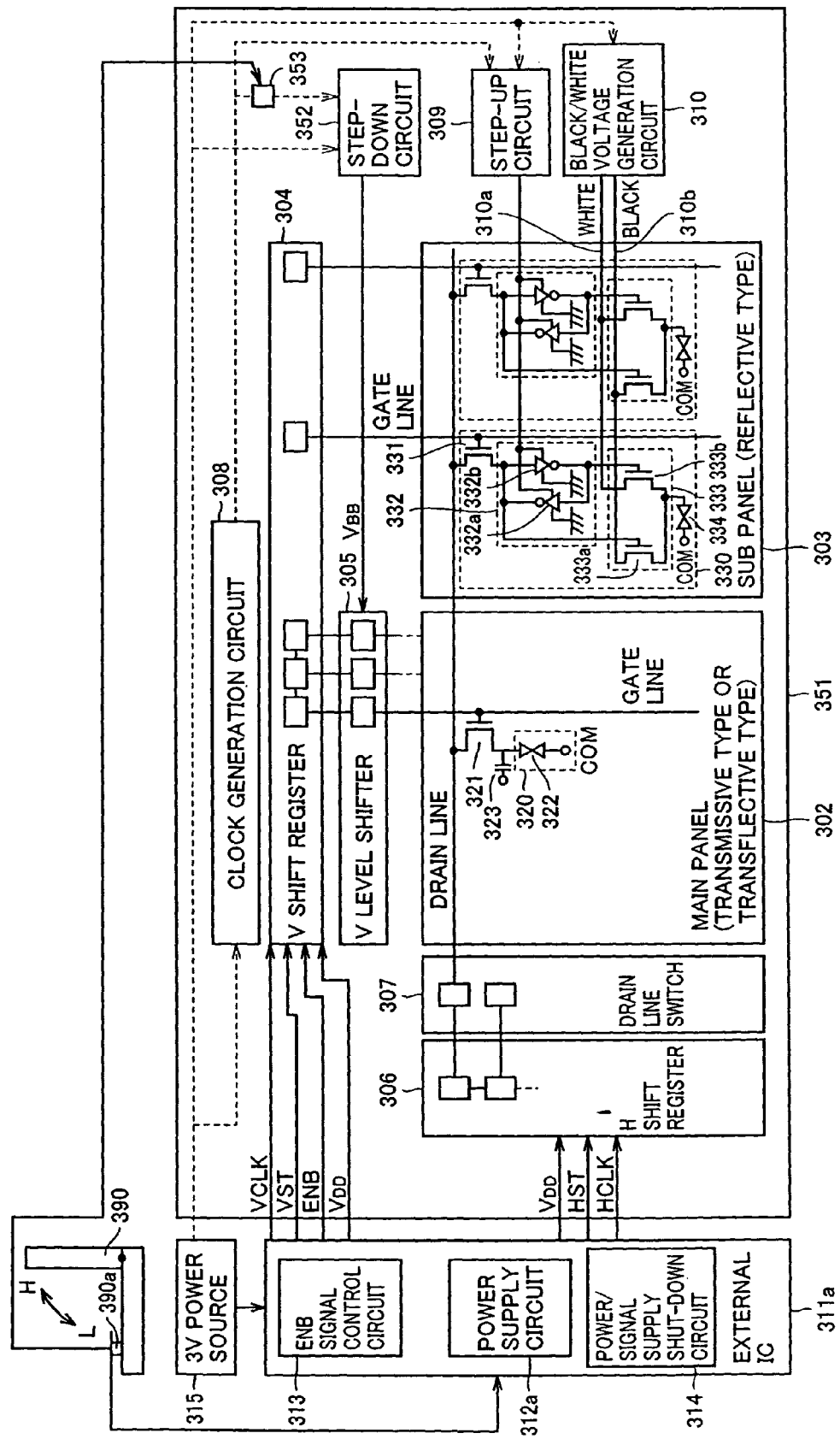
FIG. 19 is a plan view showing a liquid crystal display including a main panel and a sub panel according to an eighth embodiment of the present invention.
Figure 20:
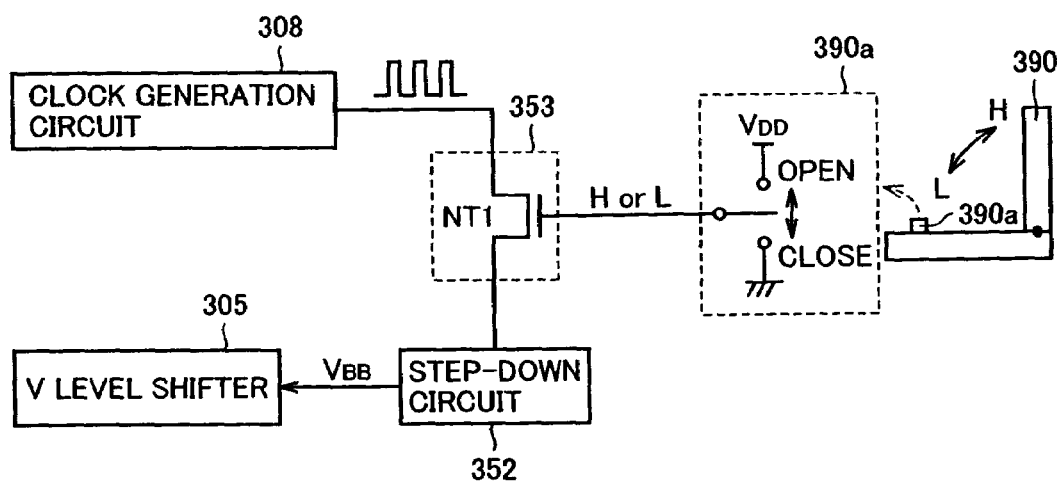
FIG. 20 is a circuit diagram showing a negative voltage supply shutdown circuit of the liquid crystal display according to the eighth embodiment shown in FIG. 19 in detail.

Referring to FIGS. 19 and 20, a step-down circuit 352 for supplying a negative voltage $V_{BB}$ to a V level shifter 305 and a negative voltage supply shutdown circuit 353 for shutting down supply of the negative voltage $V_{BB}$ from the step-down circuit 352 to the V level shifter 305 are formed on a glass substrate 351 in a liquid crystal display according to an eighth embodiment of the present invention, in addition to a structure identical to that of the aforementioned seventh embodiment. The remaining structure of the liquid crystal display according to the eighth embodiment is similar to that of the aforementioned seventh embodiment.

According to the eighth embodiment, the step-down circuit 352 and the negative voltage supply shutdown circuit 353 are further provided on the glass substrate 351. The step-down circuit 352 is an example of the "negative voltage generation circuit" in the present invention.

As shown in FIG. 20, the negative voltage supply shutdown circuit 353 is connected between a clock generation circuit 308 and the step-down circuit 352, and constituted of an N-channel transistor NT301. An output of an opening/closing detection switch 390a of a portable telephone 390 is connected to the gate of the N-channel transistor NT301.

According to the eighth embodiment, an external IC 311a is provided outside the glass substrate 351. The external IC 311a is provided with a power supply circuit 312a for generating a positive voltage $V_{DD}$, an ENB signal control circuit 313 and a power/signal supply shutdown circuit 314.

Referring to FIG. 20, the opening/closing detection switch 390a is connected to the positive voltage $V_{DD}$ when the portable telephone 390 is opened for using a main panel 302 in operation of the negative voltage supply shutdown circuit 353. Thus, a high level is supplied to the gate of the N-channel transistor NT301, thereby turning on the N-channel transistor NT301. In this state, the clock generation circuit 308 supplies a clock signal to the step-down circuit 352. The step-down circuit 352 performs a step-down operation, thereby generating the negative voltage $V_{BB}$. The generated negative voltage $V_{BB}$ is supplied to the V level shifter 305.

When the portable telephone 390 is closed so that main panel 302 is not used (only a sub panel 303 is used), the opening/closing detection switch 390a is connected to a ground terminal to supply a low level to the gate of the N-channel transistor NT301. In this case, the N-channel transistor NT301 is turned off, to supply no clock signal from the clock generation circuit 308 to the step-down circuit 352. Thus, the step-down circuit 352 generates no negative voltage $V_{BB}$ to be supplied to the V level shifter 305.

According to the eighth embodiment, as hereinabove described, the step-down circuit 352 and the negative voltage supply shutdown circuit 353 are so provided on the glass substrate 351 that the negative voltage supply shutdown circuit 353 can stop supplying the negative voltage $V_{BB}$ to the V level shifter 305 when only the sub panel 303 is used, whereby power consumption can be further reduced.

Effects of the eighth embodiment attained by the same structure or method as the seventh embodiment are similar to those of the aforementioned seventh embodiment.

Ninth Embodiment

Figure 21:
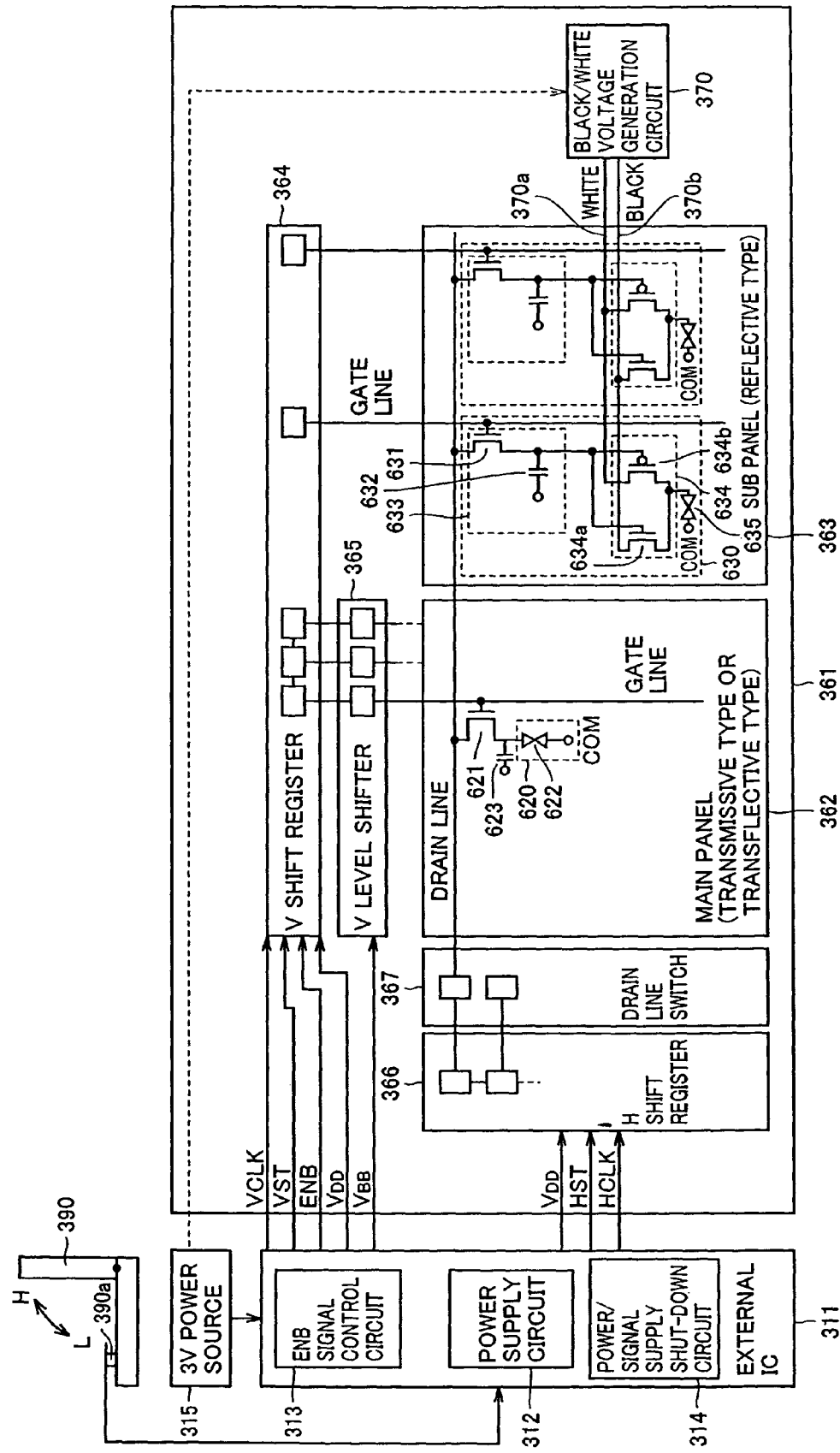
FIG. 21 is a plan view showing a liquid crystal display including a main panel and a sub panel according to a ninth embodiment of the present invention.

Referring to FIG. 21, each pixel of a sub panel 363 stores a DRAM (dynamic random access memory) 633 in a liquid crystal display according to a ninth embodiment of the present invention, dissimilarly to the aforementioned seventh and eighth embodiments.

A glass substrate 361, a main panel 362 consisting of a transmissive or transflective panel and the sub panel 363 consisting of a reflective panel in the liquid crystal display according to the ninth embodiment are identical in structure to the glass substrate 301, the main panel 302 and the sub panel 303 according to the seventh embodiment shown in FIG. 15 respectively. The glass substrate 361 is an example of the "substrate" in the present invention. The main panel 362 is an example of the "first display panel" in the present invention, and the sub panel 363 is an example of the "second display panel" in the present invention.

Further, an H shift register 366, a drain line switch 367, a V shift register 364 and a V level shifter 365 according to the ninth embodiment are identical in structure to the H shift register 306, the drain line switch 307, the V shift register 304 and the V level shifter 305 according to the seventh embodiment shown in FIG. 15 respectively.

The V shift register 364 and the H shift register 366 are examples of the "signal line driving circuit" in the present invention, and the H shift register 366 is an example of the "second shift register" in the present invention.

According to the ninth embodiment, each pixel of the sub panel 363 includes the DRAM 633, a signal selection circuit 634 and a liquid crystal 635. The DRAM 633 includes a switching transistor 631 and a capacitor 632. The signal selection circuit 634 includes an N-channel transistor 634a and a P-channel transistor 634b.

The switching transistor 631 of the DRAM 633 has a drain connected to a drain line and a gate connected to a gate line respectively. A first electrode of the capacitor 63 is connected to the source of the switching transistor 631. The source of the switching transistor 631 is connected to the gates of the N-channel transistor 634a and the P-channel transistor 634b. The drain of the N-channel transistor 634a is connected to a black/white voltage generation circuit 370 through a black power supply line 370b. The drain of the P-channel transistor 634b is connected to the black/white voltage generation circuit 370 through a white power supply line 370a. Both of the sources of the N-channel transistor 634a and the P-channel transistor 634b are connected to a pixel electrode of the liquid crystal 635. The sub reflective panel 363 is provided with display pixel regions 330 including the DRAMs 633 and the signal selection circuits 634.

Each pixel of the main panel 362 includes a switching transistor 622, a liquid crystal 622 and a storage capacitor 623.

The internal structure of and a driving method for the V shift register 364 of the liquid crystal display according to the aforementioned ninth embodiment are identical to the internal structure of and the driving method for the V shift register 304 according to the seventh embodiment described with reference to FIGS. 13 and 18.

In the sub panel 363, ENB signals ENB1 and ENB2 are brought into high levels for constant periods at the rate of about once per second, thereby supplying a high- or low-level signal to each DRAM 633 only about once per second.

In other words, the sub panel 363 is scanned at a frequency (about 1 Hz) of about once per second regardless of a scanning frequency (about 60 Hz) of the V shift register 364. When each DRAM 633 holds a high-level signal, the N-channel transistor 634a and the P-channel transistor 634b of the signal selection circuit 634 are turned on and off respectively. Thus, the black/white voltage generation circuit 370 supplies a black voltage to the pixel electrode of each liquid crystal 635 through the black power supply line 370b and the N-channel transistor 634a. Thus, black display is made.

When each DRAM 633 holds a low level, on the other hand, the N-channel transistor 634a and the P-channel transistor 634b are turned off and on respectively. In this case, the black/white voltage generation circuit 370 supplies a white voltage to the pixel electrode of each liquid crystal 635 through the white power supply line 370a and the P-channel transistor 634b. Thus, white display is made.

The DRAM 633, which cannot hold data for a long time dissimilarly to the SRAMs 332 according to the seventh and eighth embodiments, must be refreshed every constant period.

When only the main panel 362 is used in the ninth embodiment, the ENB signals ENB1 and ENB2 corresponding to the sub panel 363 are regularly set to low levels, similarly to the aforementioned seventh embodiment. Thus, outputs from AND circuits AND1 ad AND2 regularly go low, thereby regularly holding gate lines G1 and G2 at low levels. Thus, the switching transistors 631 are regularly turned off to supply no signal to the DRAMs 633 of the sub panel 363. The black/white voltage generation circuit 370 is also turned off to make no display on the sub panel 363. ENB signals ENB3 and ENB4 corresponding to the main panel 362 are brought into high levels for constant periods in all scanning. Thus, only the main panel 362 makes display.

When only the sub panel 363 is used without using the main panel 362, driving is performed similarly to the seventh embodiment so that only the sub panel 363 makes black or white display.

When only the sub panel 363 is used while the DRAMs 633 hold data, a power/signal supply shutdown circuit 314 of an external IC 311 is employed for stopping supply of power and signals from the external IC 311 to the V shift register 364, the V level shifter 365 and the H shift register 366. A 3 V power source 315 supplies power only through paths shown by dotted lines in FIG. 21.

According to the ninth embodiment, as hereinabove described, each pixel of the sub panel 363 stores the DRAM 633 serving as a signal holding circuit so that the DRAM 633 can hold a signal in a period up to subsequent scanning also when the scanning frequency for the sub panel 363 is reduced and a rewrite cycle therefor is lengthened, whereby flicker or ununiformity on display can be inhibited. Thus, the scanning frequency for the sub panel 363 can be easily rendered smaller than that for the main panel 362.

According to the ninth embodiment, further, each signal selection circuit 634 is constituted of the N-channel transistor 634a and the P-channel transistor 634b, to be capable of easily selecting a digital video signal corresponding to a signal held in the DRAM 633 and supplying the same to the pixel electrode of the liquid crystal 635 when the DRAM 633 is employed as a data holding circuit.

Effects of the ninth embodiment attained by the same structure or method as that of the seventh or eighth embodiment are similar to those of the aforementioned seventh or eighth embodiment.

The liquid crystal display according to the ninth embodiment is provided with the power/signal supply shutdown circuit 314 for shutting down supply of power and driving signals to the V shift register 364 and the H shift register 366 when the sub panel 363 is used while the DRAMs 633 of the sub panel 363 hold signals, whereby power consumption can be easily reduced.

When only the sub panel 363 is used while the DRAMs 633 of the sub panel 363 hold signals, the power/signal supply shutdown circuit 314 stops supplying power from the power supply circuit 312 so that only the 3 V power source 315 supplies power, whereby the small 3 V power source 315 can be easily employed when only the sub panel 363 is used. Power consumption can be reduced also by this.

Tenth Embodiment

Figure 22:
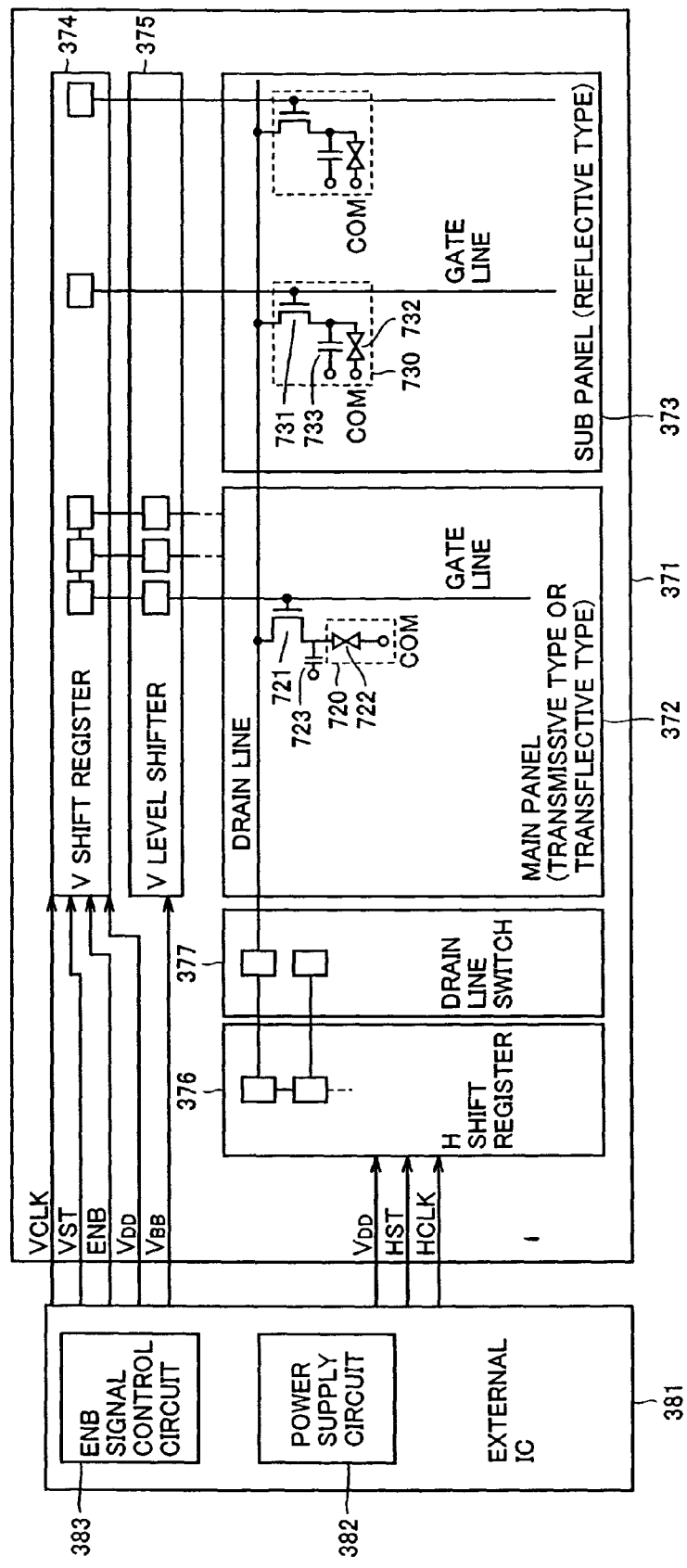
FIG. 22 is a plan view showing a liquid crystal display including a main panel and a sub panel according to a tenth embodiment of the present invention.
Figure 23:
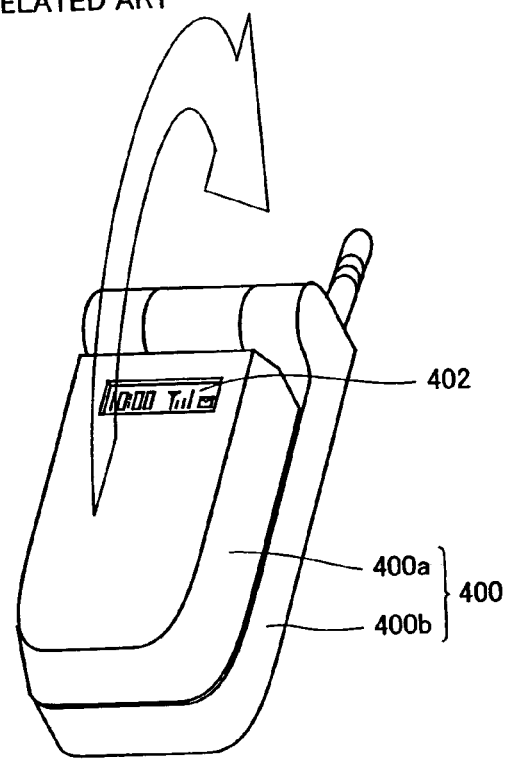
FIGS. 23 and 24 are perspective views showing a conventional folding portable telephone including a main panel and a sub panel.
Figure 24:
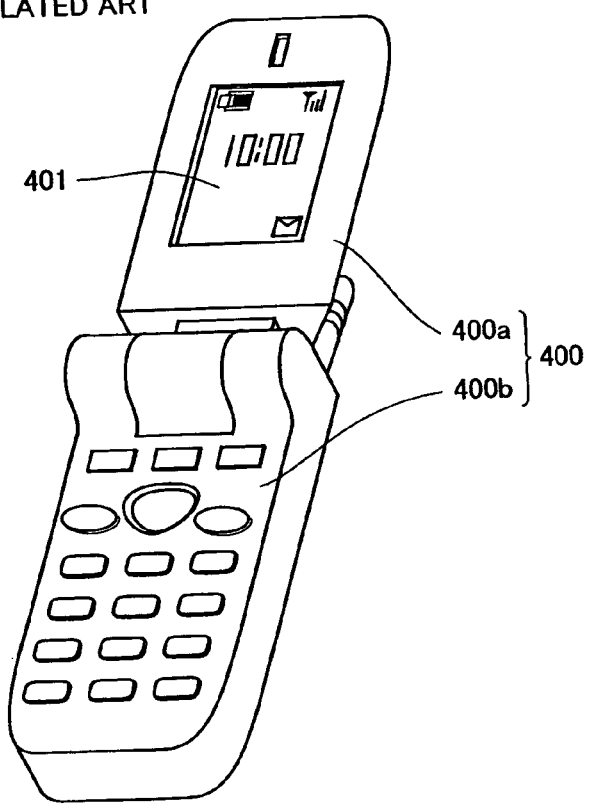

Referring to FIG. 22, each pixel of a sub panel 373 of a liquid crystal display according to a tenth embodiment of the present invention is provided with a storage capacitor 733 having a large capacitance capable of sufficiently holding a signal also when a scanning frequency for the sub panel 373 is reduced for lengthening a scanning period, dissimilarly to the aforementioned seventh to ninth embodiments.

Referring to FIG. 22, a glass substrate 371, a main panel 372, the sub panel 373, an H shift register 376, a drain line switch 377 and a V shift register 374 according to the tenth embodiment are similar in structure to the elements from the glass substrate 301 to the V shift register 304 according to the seventh embodiment shown in FIG. 15.

According to the tenth embodiment, a V level shifter 375 is provided between the V shift register 374 and the main panel 372 not only on a portion corresponding to the main panel 372 but also on a portion corresponding to the sub panel 373. The V level shifter 375 is an example of the "level shifter" in the present invention.

An external IC 381 includes a power supply circuit 382 and an ENB signal control circuit 383. The external IC 381 is similar in structure to the external IC 210 according to the fifth embodiment shown in FIG. 11.

Each pixel of the main panel 372 includes a switching transistor 721, a liquid crystal 722 and a storage capacitor 723.

According to the tenth embodiment, each pixel of the sub panel 373 includes a switching transistor 731, a liquid crystal 732 and the storage capacitor 733. The storage capacitor 733 has a larger capacitance than the storage capacitor 723 of the main panel 372 to be capable of sufficiently holding a signal also when the scanning frequency for the sub panel 373 is reduced for lengthening the scanning period. According to the tenth embodiment, the sub panel 373 is formed by a reflective panel and hence reflective electrodes (not shown) constituting display pixel regions 730 are formed to cover the switching transistors 731 and the storage capacitors 733. Also when the storage capacitors 733 are largely formed, therefore, the display pixel regions 730 are not reduced in size.

According to the tenth embodiment, the main panel 372 and the sub panel 373 are subjected to common electrode AC driving, similarly to the seventh embodiment.

According to the tenth embodiment, the sub panel 373 is also subjected to common electrode AC driving and displays analog video signals, and hence a negative voltage must be applied to each gate line of the sub panel 373 similarly to the main panel 373.

The internal structure of and a driving method for the V shift register 374 of the liquid crystal display according to the tenth embodiment are basically different to the internal structure of and the driving method for the V shift register 304 according to the seventh embodiment described with reference to FIGS. 13 and 18 except the frequency for scanning the sub panel 373, and hence redundant description is omitted.

According to the tenth embodiment, as hereinabove described, the storage capacitors 733 having the large capacitance capable of sufficiently holding video signals in a period up to subsequent scanning also when the scanning frequency for the sub panel 373 is reduced for lengthening the rewrite cycle for the sub panel 373 are so provided that flicker or ununiformity on display can be inhibited. Thus, the scanning frequency for the sub panel 373 can be easily rendered smaller than that for the main panel 372. In this case, the storage capacitors 733 of the sub panel 373 preferably have a capacitance of at least three times that of the storage capacitors 723 of the main panel 372. The storage capacitors 733 of the sub panel 373 having a capacitance of about three to four times the capacitance of the storage capacitors 723 of the main panel 372 can be easily formed in consideration of the layout of the sub panel 203. In this case, the display on the sub panel 373 is preferably rewritten at a frequency (about 15 Hz to about 20 Hz) of about 15 to 20 times per second.

Effects of the tenth embodiment attained by the same structure or method as that in any of the seventh to ninth embodiments are similar to those of any of the aforementioned seventh to ninth embodiments.

Although the present invention has been described and illustrated in detail, it is clearly understood that the same is by way of illustration and example only and is not to be taken by way of limitation, the spirit and scope of the present invention being limited only by the terms of the appended claims.

For example, while each of the above embodiments has been described with reference to a liquid crystal display for a portable telephone including two liquid-crystal display panels, i.e., a main panel and a sub panel, the present invention is not restricted to this but is also applicable to a display for a portable apparatus other than the portable telephone including a plurality of display panels or a display for an apparatus other than a portable apparatus.

While the liquid crystal display includes two liquid crystal panels, i.e., the main panel and the sub panel in each of the aforementioned embodiments, the present invention is not restricted to this but is also applicable to a liquid crystal display including at least three display panels.

While the present invention is applied to a display including liquid crystal display panels in each of the aforementioned embodiments, the present invention is not restricted to this but is also applicable to a display including self-luminous elements such as EL display panels. When the present invention is applied to EL display panels, a main panel and a sub panel may be formed by top emission panel and a bottom emission panel respectively, for example.

Figure 4:
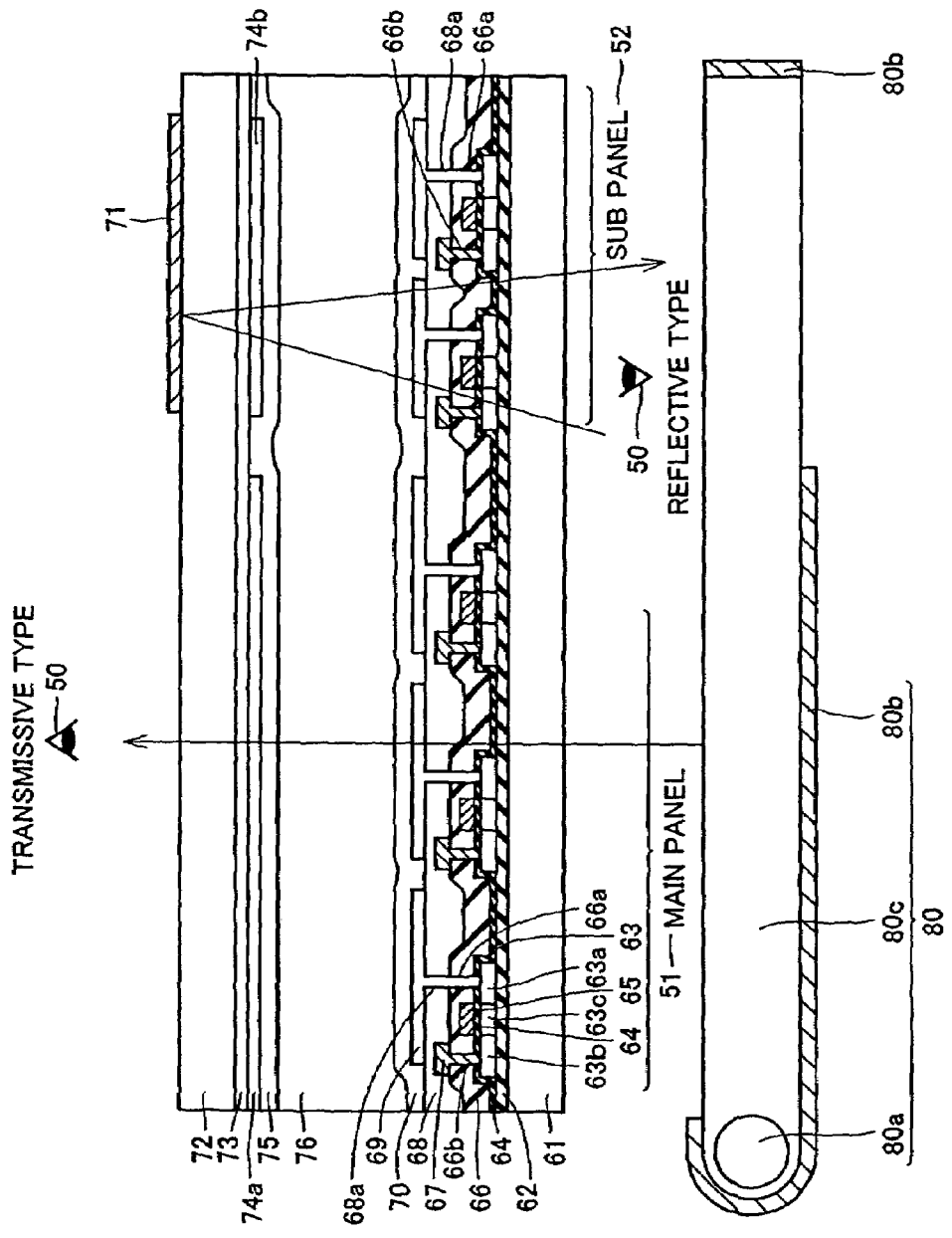
FIG. 4 is a sectional view showing a liquid crystal display including a main panel and a sub panel according to a second embodiment of the present invention.

While an LED is employed in the modification of the first embodiment shown in FIG. 3 in place of the cold cathode fluorescent tube 31 according to the first embodiment shown in FIG. 2, the present invention is not restricted to this but an LED light source such as that shown in FIG. 3 may alternatively be employed in place of the backlight unit 80 or 110 including the cold cathode fluorescent tube 80a or 111 in the second or third embodiment shown in FIG. 4 or 5.

While the drain lines are rendered common to the main panel and the sub panel in each of the aforementioned embodiments, the present invention is not restricted to this but the gate lines may alternatively be rendered common to the main panel and the sub panel. In this case, the main panel and the sub panel may be arranged along the longitudinal direction of the gate lines.

While the main panel and the sub panel share both of the V shift register and the H shift register in each of the aforementioned embodiments, the present invention is not restricted to this but the main panel and the sub panel may alternatively share only either the V shift register or the H shift register.

While the storage capacitor is connected to each pixel of the sub panel for holding data for a constant period in each of the aforementioned embodiments, the present invention is not restricted to this but each pixel of the sub panel may alternatively store an SRAM (static random access memory) for holding data for a constant period.

While the clock generation circuit 308, the black/white voltage generation circuit 310 and the step-up circuit 309 are provided on the glass substrate 301 in each of the aforementioned seventh to ninth embodiments, the present invention is no restricted to this but these circuits 308 to 310 may alternatively be provided outside the panels 302 and 303 or 362 and 363.

While the main panel and the sub panel share the V shift register and the H shift register in each of the aforementioned embodiments, the present invention is not restricted to this but V shift registers and H shift registers may alternatively be provided for the main panel and the sub panel independently of each other. In this case, different dedicated clock signals can be input in the V shift register and the H shift register for the main panel and in the V shift register and the H shift register for the sub panel respectively, whereby the clock signals input in the V shift register and the H shift register for the main panel can be rendered slower than those input in the V shift register and the H shift register for the sub panel, for example. In this case, the scanning frequencies for the main panel and the sub panel can be made different from each other without shutting down outputs of the sub panel by the ENB signals in scanning.

While the scanning frequency for the sub panel is rendered smaller than that for the main panel in each of the aforementioned embodiments, the present invention is not restricted to this but the scanning frequency for the sub panel may alternatively be rendered larger than that for the main panel.

While the ENB signals are employed for shutting down outputs to the gate lines corresponding to the main panel and scanning of the gate lines corresponding to the sub panel is output only once in a plurality of times (about once per second) when only the sub panel is used in each of the aforementioned embodiments, the present invention is not restricted to this but outputs to the gate lines corresponding to the main panel may be shut down through ENB signals while reducing frequencies of vertical and horizontal clock signals VCLK and HCLK supplied to the sub panel when only the sub panel is used thereby reducing the scanning frequency for the sub panel.

What is claimed is:

1. A display comprising:
    a first display panel formed on a substrate; and
    a second display panel formed on the same substrate in a region different from the region formed with said first display panel, wherein
    said first display panel includes either a transmissive main display panel or a transflective main display panel,
    said second display panel includes a reflective auxiliary display panel, said substrate includes a first substrate formed with a plurality of pixel electrodes, said display further comprises a second substrate arranged to be opposite to said first substrate, a first counter electrode is formed on a region formed with said first display panel of said second substrate, a second counter electrode is formed on a region formed with said second display panel of said second substrate, and said first counter electrode and said second counter electrode are formed to be isolated from each other.

2. The display according to claim 1, wherein said first display panel includes a transparent electrode formed on said first substrate to constitute said pixel electrode and a transparent electrode formed on said second substrate to constitute the first counter electrode, and display on said first display panel is observed from the side of said first substrate, and said second display panel includes a reflective electrode formed on said first substrate to constitute said pixel electrode and a transparent electrode formed on said second substrate to constitute the second counter electrode, consisting of the same layer as a counter electrode of said first display panel, and display on said second display panel is observed from the side of said second substrate.

3. The display according to claim 1, wherein said first display panel includes a transparent electrode formed on said first substrate to constitute said pixel electrode and a transparent electrode formed on said second substrate to constitute the first counter electrode, and display on said first display panel is observed from the side of said second substrate, and said second display panel includes a transparent electrode formed on said first substrate to constitute said pixel electrode, a transparent electrode formed on said second substrate to constitute the second counter electrode and a reflective layer formed separately from said counter electrode, and display on said second display panel is observed from the side of said first substrate.

4. The display according to claim 3, wherein said reflective layer is formed on a surface of said second substrate opposed to said first substrate.

5. The display according to claim 1, wherein both of display on said first display panel and display on said second display panel are observed from the side of said second substrate, and said second display panel includes a first reflective electrode formed on said first substrate to constitute said pixel electrode.

6. The display according to claim 5, wherein said first display panel includes a second reflective electrode formed on said first substrate, and said first reflective electrode and said second reflective electrode consist of the same layer.

7. The display according to claim 1, further comprising a shift register shared by said first display panel and said second display panel.

8. The display according to claim 7, wherein said shift register formed to continuously extend from said first display panel to said second display panel includes:

a first shift register for driving a gate line of said first display panel and a gate line of said second display panel, and a second shift register for driving a drain line of said first display panel and a drain line of said second display panel.

9. The display according to claim 8, wherein said first display panel and said second display panel are arranged along the longitudinal directions of said drain lines.

10. The display according to claim 9, wherein said second shift register driving said drain lines is arranged between said first display panel and said second display panel.

11. The display according to claim 7, further comprising a level shifter arranged on a portion corresponding to said first display panel for converting the voltage level of a signal supplied to said gate line of said first display panel.

12. The display according to claim 7, further comprising an output shutdown circuit shutting down an output from either said portion of said first shift register corresponding to said first display panel or said portion corresponding to said second display panel.

13. The display according to claim 7, wherein either said gate lines or said drain lines are rendered common to said first display panel and said second display panel.

14. The display according to claim 13, wherein said first display panel and said second display panel are arranged along the longitudinal directions of said drain lines, and said drain lines continuously extend from said first display panel to said second display panel.

15. The display according to claim 1, further comprising a drain line and a gate line arranged to intersect with each other, wherein either said drain line or said gate line continuously extends from said first display panel to said second display panel.

16. The display according to claim 1, further comprising:

a drain line and a gate line arranged on said substrate to intersect with each other, and a static memory built in said second display panel for holding a signal from said drain line in response to a signal input from said gate line.

17. The display according to claim 16, further comprising a signal selection circuit selecting a digital video signal supplied to a pixel in response to a signal from said static memory.

18. The display according to claim 16, wherein said first display panel includes a plurality of pixels, arranged in the form of a matrix, supplied with an analog video signal from said drain line in response to said signal input from said gate line.

19. The display according to claim 16, further comprising:

a signal line driving circuit for driving said drain line and said gate line, and a power/signal supply shutdown circuit for shutting down supply of power and a driving signal to said signal line driving circuit when said second display panel is used while said static memory of said second display panel holds said signal.

20. The display according to claim 19, further comprising:

a first power supply circuit for supplying power to said signal line driving circuit, a second display panel driving circuit for driving said second display panel, and a second power supply circuit for supplying power to said second display panel driving circuit, wherein said power/signal supply shutdown circuit shuts down supply of power from said first power supply circuit to said signal line driving circuit and said second power supply circuit supplies power to said second display panel driving circuit when said second display panel is used while said static memory of said second display panel holds said signal.

21. The display according to claim 16, further comprising:
a level shifter for converting the voltage level of a signal supplied to said gate line of said first display panel,
a negative voltage generation circuit formed on said substrate for generating a negative voltage supplied to said level shifter, and
a negative voltage supply shutdown circuit for shutting down supply of said negative voltage from said negative voltage generation circuit to said level shifter when said second display panel is used.

22. The display according to claim 1, wherein
a signal is scanned at a first scanning frequency on said first display panel, and
a signal is scanned at a second scanning frequency different from said first scanning frequency on said second display panel.

23. The display according to claim 22, further comprising:
a first shift register for driving a gate line of said first display panel and a gate line of said second display panel,
a second shift register for driving a drain line of said first display panel and a drain line of said second display, and
an output shutdown circuit shutting down an output from either a portion of said first shift register corresponding to said first display panel or another portion corresponding to said second display panel.

24. The display according to claim 22, wherein
said second scanning frequency is smaller than said first scanning frequency.

25. The display according to claim 24, wherein
each pixel of said first display panel includes a first storage capacitor, and
each pixel of said second display panel includes a second storage capacitor having a larger capacitance value than said first storage capacitor for a period scanned at said second scanning frequency.

26. The display according to claim 22, further comprising a drain line and a gate line arranged on said substrate to intersect with each other, wherein
said second display panel includes a static memory for holding a signal from said drain line in response to a signal input from said gate line.

27. The display according to claim 22, further comprising a drain line and a gate line arranged on said substrate to intersect with each other, wherein
said second display panel includes a dynamic memory for holding a signal from said drain line in response to a signal input from said gate line.

28. A display comprising:
a first display panel formed on a substrate;
a second display panel formed on the same substrate in a region different from the region formed with said first display panel; and
a shift register formed to continuously extend from said first display panel to said second display panel, wherein
said first display panel includes either a transmissive display panel or a transflective display panel,
said second display panel includes a reflective display panel,
said substrate includes a first substrate formed with a plurality of pixel electrodes,
said display further comprises a second substrate arranged to be opposite to said first substrate,
a first counter electrode is formed on a region formed with said first display panel of said second substrate,
a second counter electrode is formed on a region formed with said second display panel of said second substrate, and
said first counter electrode and said second counter electrode are formed to be isolated from each other.

29. A display comprising:
a first display panel formed on a substrate;
a second display panel formed on the same substrate in a region different from the region formed with said first display panel; and
a drain line and a gate line arranged to intersect with each other, wherein
either said drain line or said gate line continuously extends from said first display panel to said second display panel,
said first display panel includes either a transmissive display panel or a transflective display panel,
said second display panel includes a reflective display panel,
said substrate includes a first substrate formed with a plurality of pixel electrodes,
said display further comprises a second substrate arranged to be opposite to said first substrate,
a first counter electrode is formed on a region formed with said first display panel of said second substrate,
a second counter electrode is formed on a region formed with said second display panel of said second substrate, and
said first counter electrode and said second counter electrode are formed to be isolated from each other.

30. A display comprising:
a first display panel formed on a substrate;
a second display panel formed on the same substrate in a region different from the region formed with said first display panel;
a drain line and a gate line arranged on said substrate to intersect with each other; and
a static memory built in said second display panel for holding a signal from said drain line in response to a signal input from said gate line, wherein
said first display panel includes either a transmissive display panel or a transflective display panel,
said second display panel includes a reflective display panel,
said substrate includes a first substrate formed with a plurality of pixel electrodes,
said display further comprises a second substrate arranged to be opposite to said first substrate,
a first counter electrode is formed on a region formed with said first display panel of said second substrate,
a second counter electrode is formed on a region formed with said second display panel of said second substrate, and
said first counter electrode and said second counter electrode are formed to be isolated from each other.

31. A display comprising:
a first display panel formed on a substrate so that a signal is scanned at a first scanning frequency; and
a second display panel formed on the same substrate in a region different from the region formed with said first display panel so that a signal is scanned at a second scanning frequency different from said first scanning frequency, wherein said first display panel includes either a transmissive display panel or a transflective display panel, said second display panel includes a reflective display panel, said substrate includes a first substrate formed with a plurality of pixel electrodes, said display further comprises a second substrate arranged to be opposite to said first substrate, a first counter electrode is formed on a region formed with said first display panel of said second substrate, a second counter electrode is formed on a region formed with said second display panel of said second substrate, and said first counter electrode and said second counter electrode are formed to be isolated from each other.

* * * * *